US012519757B2

(12) United States Patent
Robert

(10) Patent No.: US 12,519,757 B2
(45) Date of Patent: Jan. 6, 2026

(54) METHODS, DEVICES AND SYSTEM RELATED TO A DISTRIBUTED LEDGER AND USER IDENTITY ATTRIBUTE

(71) Applicant: Telefonaktiebolaget LM Ericsson (publ), Stockholm (SE)

(72) Inventor: Remi Robert, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 18/254,164

(22) PCT Filed: Nov. 30, 2020

(86) PCT No.: PCT/EP2020/083982
§ 371 (c)(1),
(2) Date: May 23, 2023

(87) PCT Pub. No.: WO2022/111838
PCT Pub. Date: Jun. 2, 2022

(65) Prior Publication Data
US 2024/0031341 A1 Jan. 25, 2024

(51) Int. Cl.
*H04L 9/40* (2022.01)
(52) U.S. Cl.
CPC .............................. *H04L 63/0421* (2013.01)
(58) Field of Classification Search
CPC ..... H04L 63/0421; H04L 9/3239; H04L 9/50; H04L 2209/42; H04L 63/0407; H04L 9/0894
See application file for complete search history.

(56) References Cited

U.S. PATENT DOCUMENTS 10,237,259 B2 * 3/2019 Ronda ................... H04L 9/3247
2016/0218875 A1 * 7/2016 Le Saint ............... H04L 9/0822
(Continued)

FOREIGN PATENT DOCUMENTS

WO 2019204794 A1 10/2019

OTHER PUBLICATIONS

Soltani et al., "A New Approach to Client Onboarding using Self-Sovereign Identity and Distributed Ledger", Jul. 2018, IEEE International Conference on Internet of Things, pp. 1129-1136 (Year: 2018).*

(Continued)

*Primary Examiner* — Kenneth W Chang
(74) *Attorney, Agent, or Firm* — Nicholson De Vos Webster & Elliott LLP

(57) ABSTRACT

A first network device obtains information about a user device from an identity management device, and registers a user identity attribute request. The first network device commits to a distributed ledger, a first transaction comprising the user identity attribute request. One or more second network devices receive the first transaction; receive from a user device related to the first transaction, at least a user identity attribute and a proof; receive data from an identity management device; verify validity of the proof based on the data received from the identity management device, and commit to the distributed ledger a second transaction comprising a list of user identity attributes and integrity validation data. The first network device further receives second transactions each second transaction comprising the list of user identity attributes and the integrity validation data. The first network device verifies the list of user identity attributes comprised in the second transactions.

20 Claims, 11 Drawing Sheets

(56) References Cited

U.S. PATENT DOCUMENTS

| | | | |
|---|---|---|---|
| 2016/0260171 A1 | 9/2016 | Ford et al. | |
| 2018/0075421 A1 | 3/2018 | Serrano et al. | |
| 2018/0137512 A1* | 5/2018 | Georgiadis | H04L 63/08 |
| 2018/0234433 A1* | 8/2018 | Oberhauser | G06Q 20/02 |
| 2019/0036932 A1* | 1/2019 | Bathen | H04L 63/0428 |
| 2019/0289013 A1* | 9/2019 | Makmel | H04L 63/0876 |
| 2019/0333054 A1* | 10/2019 | Cona | H04L 9/3297 |
| 2020/0145229 A1 | 5/2020 | Li et al. | |
| 2020/0204557 A1 | 6/2020 | Singh et al. | |

OTHER PUBLICATIONS

Communication under Rule 71(3) EPC, EP App. No. 20817260.1, Oct. 11, 2023, 8 pages.

International Search Report and Written Opinion for Application No. PCT/EP2020/083982, Jul. 29, 2021, 15 pages.

International Preliminary Report on Patentability for Application No. PCT/EP2020/083982, Feb. 27, 2023, 21 pages.

Aybek Mukhamedov et al., "On Anonymity with Identity Escrow," 2005, 9 pages.

"Sovrin™: A Protocol and Token for Self-Sovereign Identity and Decentralized Trust," A White Paper from the Sovrin Foundation, Jan. 2018, 42 pages, Version 1.0.

Manu Sporny et al., "Verifiable Credentials Data Model 1.0, Expressing verifiable information on the Web," W3C Recommendation Nov. 19, 2019, 111 pages, W3C, downloaded from https://www.w3.org/TR/vc-data-model/ on Nov. 9, 2020.

Andrew Tobin, "Sovrin: What Goes on the Distributed ledger?", 2018, 12 pages, Evernym.

M. Jones, "JSON Web Signature (JWS) Unencoded Payload Option," Feb. 2016, 11 pages, Internet Engineering Task Force (IETF), Request for Comments: 7797, 2016 IETF Trust and the persons identified as the document authors.

* cited by examiner

METHODS, DEVICES AND SYSTEM RELATED TO A DISTRIBUTED LEDGER AND USER IDENTITY ATTRIBUTE

CROSS-REFERENCE TO RELATED APPLICATIONS

This application is a National stage of International Application No. PCT/EP2020/083982, filed Nov. 30, 2020, which is hereby incorporated by reference.

TECHNICAL FIELD

The invention relates to a first network device, a second network device, a method performed by a first network device, a method performed by a second network device, a system, corresponding computer programs and carriers, provided thereof. The invention is related to a distributed ledger and user identity attribute.

BACKGROUND

Blockchain systems have been used in multiple identity management and authentication systems because of their distributed and data tamper-resistance properties. Depending on the implementation there are variations regarding the storing of information in a distributed ledger and the ways in which the information is communicated to different entities involved. In some systems such as Sovrin™ ("Sovrin™: A Protocol and Token for Self-Sovereign Identity and Decentralized Trust", A White Paper from the Sovrin Foundation Version 1.0 January 2018), a user's identity data is not stored in a ledger but located only on a client operated system (for example, in a wallet) and shared using pieces of software called agents.

Systems, such as Sovrin™, are intended for a user entity to have full control over the storing and accessing of some of the user entity's data. As a result, the user entity may choose one, or more, public data systems, such as Sovrin™, to make the user entity's data accessible to other entities. Other systems interacting with the user entity may, thus, obtain information about the user entity through such public data systems.

The publication, "Verifiable Credentials Data Model 1.0, Expressing verifiable information on the Web", W3C Recommendation 19 Nov. 2019 (https://www.w3.org/TR/vc-data-model/, retrieved on Nov. 9, 2020) provides a mechanism to express credentials on the Web in a way that is cryptographically secure, privacy respecting, and machine-verifiable.

The publication "On Anonymity with Identity Escrow" by Aybek Mukhamedov et. al, discusses a protocol for anonymity with identity escrow.

There are issues with accessing a user entity's user identity data by a third-party entity, if the user identity data were to be removed from the public data system or access to the user identity data were to be revoked.

SUMMARY

An object of the present invention is to enable a provision of guarantee, in relation to a user identity attribute, to a verifying entity interacting with a user entity, while preserving/enhancing the privacy of the user entity. This could, for example, be in a smart contract context.

To achieve said object, in a first aspect there is provided a method performed by a first network device. The method of this first aspect comprises obtaining, from an identity management device, information about a user device. The method further comprises registering a user identity attribute request for the user device in the first network device. The method further comprises committing to a distributed ledger a first transaction comprising the user identity attribute request. The method further comprises receiving second transactions committed to the distributed ledger by a plurality of second network devices, each second transaction comprising a list of user identity attributes and integrity validation data of the user identity attributes. The method further comprises verifying the list of user identity attributes comprised in the second transactions, wherein the verifying comprises comparing the integrity validation data comprised in a first of the second transactions with the integrity validation data comprised in at least a further one of the second transactions.

In a second aspect, a first network device is provided. The first network device comprises one or more processors and a memory, said memory containing instructions executable by said one or more processors. The first network device of this second aspect obtains information about a user device from an identity management device, registers a user identity attribute request of the user device in the first network device. The first network device of this second aspect further commits to a distributed ledger, a first transaction comprising the user identity attribute request. The first network device of this second aspect further receives second transactions committed to the distributed ledger by a plurality of second network devices, each second transaction comprising a list of user identity attributes and integrity validation data of the user identity attributes. The first network device of this second aspect still further verifies the list of user identity attributes comprised in the second transactions, wherein the verifying comprises comparing the integrity validation data comprised in a first of the second transactions with the integrity validation data comprised in at least a further one of the second transactions.

By the first and second aspect is achieved enhanced privacy and control to the user device over the user device's user identity attribute. This is achieved due to sharing of information related to a user identity attribute, by the user device to the first network device, which is carried out on the user device's own authority, wherein a list of user identity attributes is disclosed to a first network device (or a verifying entity or any entity) with which a service or a transaction is established. By the first and second aspect is further achieved better security by preventing impersonation of a user device towards a first network device by relying on multiple second network devices for verifying the user device and the user identity attribute.

In an embodiment of the first and second aspect, the user identity attribute request comprises information relating to at least one of: a user identity attribute to be provided to the plurality of second network devices, a condition to be fulfilled for recovery of the user identity attribute of the user device, and a split of user identity attributes of the user device among a plurality of second network devices. The information relating to a condition may, for example, be a condition and/or an indication of fulfillment of a condition and/or any other information relating to a condition.

In an embodiment of the first and second aspect, it further comprises performing a re-verification of the list of user identity attributes if there is a mismatch in the integrity validation data comprised in the second transactions. The re-verification of the list of user identity attributes may include re-verification of one or more user identity attributes.

In an embodiment of the first and second aspect, performing the re-verification further comprises committing to the distributed ledger a transaction to request, from the plurality of second network devices, a list of user identity attributes and integrity validation data of the user identity attributes.

In an embodiment of the first and second aspect, the user identity attribute request further comprises a request to access the user identity attribute of the user device wherein the request to access the user identity attribute comprises data necessary to verify fulfillment of conditions regarding accessing of the user identity attribute of the user device.

In an embodiment of the first and second aspect, the request to access the user identity attribute is included in the first transaction.

In an embodiment of the first and second aspect, the integrity validation data comprises a hash value computed based on the user identity attribute of the user device.

In an embodiment of the first and second aspect, the integrity validation data is protected by a checksum or a cyclic redundancy check.

In an embodiment of the first and second aspect, the obtaining information from an identity management device comprises obtaining an address of a user agent of the user device.

In an embodiment of the first and second aspect, the method further comprises generating, for the user device, an anonymous identifier associated with the information obtained from the identity management device.

In an embodiment of the first and second aspect, the method comprises generating an anonymous identifier credential associated with the generated anonymous identifier and the user device and initiating storing of the anonymous identifier credential in the user device.

In an embodiment of the first and second aspect, the identity management device is one of Sovrin™, Hyperledger Indy, uPort, Trinsic, or any other decentralized identity management device.

In an embodiment of the first and second aspect, the first transaction further comprises the anonymous identifier and an address of a user agent. An advantage of including the anonymous identifier in the first transaction is that the anonymous identifier may be used by the second network device to verify that the anonymous identifier shared by a user device, is same as the anonymous identifier included in the first transaction, thus enabling verifying of the user device and the user identity attribute.

In an embodiment of the first and second aspect, the method further comprises authenticating the user device.

In an embodiment of the first and second aspect, the anonymous identifier is a random number.

In an embodiment of the first and second aspect, the verifying is performed by use of a consensus mechanism.

In an embodiment of the first and second aspect, the consensus mechanism includes indicating that consensus has been reached if all the integrity validation data of the second network devices match.

In an embodiment of first and second aspect, the consensus mechanism includes indicating that consensus has been reached if more than half of the integrity validation data of the second network devices match.

In a third aspect of the invention, there is provided a method performed by a second network device. The method of this third aspect comprises receiving from a distributed ledger, a first transaction. The method of this third aspect further comprises receiving from a user device related to the first transaction, at least a user identity attribute and a proof generated based on the user identity attribute. The method of this third aspect further comprises receiving data from an identity management device. The method of this third aspect further comprises verifying validity of the proof based on the data received from the identity management device. The method of this third aspect still further comprises committing to the distributed ledger a second transaction comprising a list of user identity attributes and integrity validation data of the user identity attributes.

In a fourth aspect of the invention, there is provided a second network device. The second network device of this fourth aspect comprises one or more processors and a memory, said memory containing instructions executable by said one or more processors. The second network device of this fourth aspect receives from a distributed ledger, a first transaction. The second network device of this fourth aspect receives from a user device related to the first transaction, at least a user identity attribute and a proof generated based on the user identity attribute. The second network device of this fourth aspect receives data from an identity management device. The second network device of this fourth aspect verifies validity of the proof based on the data received from the identity management device. The second network device of this fourth aspect still further commits to the distributed ledger a second transaction comprising a list of user identity attributes and integrity validation data of the user identity attributes.

By the third and fourth aspect is achieved better security by preventing impersonation of a user device towards a first network device by relying on multiple second network devices for verifying the user device and the user identity attribute. By the third and fourth aspect is further achieved preservation of the identity of the user device and/or the user by providing to the first network device, from the second network devices, a list of the user identity attributes. By the third and fourth aspect is also enabled a provision of a guarantee to the first network device for recovery of the user identity attributes, by requesting the user identity attributes from the user device.

In an embodiment of the third and fourth aspect, it comprises authenticating the second network device before receiving, from the user device, the at least a user identity attribute and the proof.

In an embodiment of the third and fourth aspect, it comprises storing the user identity attribute.

In an embodiment of the third and fourth aspect, the proof comprises an anonymous identifier. The proof comprising the anonymous identifier is to ensure that the user identity attribute requested by the plurality of second network devices refer to the same user device without violating the privacy of the user device. The proof generation further helps in showing that the user identity attribute has been certified by a known and trusted entity, In an embodiment of the third and fourth aspect, verifying the validity of the proof comprises certifying the user identity attributes with an identity management device.

In an embodiment of the third and fourth aspect, receiving a request to access the user identity attribute of the user device.

In an embodiment of the third and fourth aspect, further comprising disclosing, to the first network device, the user identity attribute and a value of the user identity attribute of the user device (101) in response to a request to access the user identity attribute of the user device.

In an embodiment of the third and fourth aspect, further comprising disclosing, upon receiving information on fulfilling a condition for recovering the user identity attribute, wherein the information is comprised in the request to access the user identity attribute of the user device.

In an embodiment of the third and fourth aspect, the identity management device is one of Sovrin™, Hyperledger Indy, uPort, Trinsic, or any other decentralized identity management device.

In a further aspect, there is provided a computer program, comprising instructions which, when executed on a first network device, cause the first network device to obtain, from an identity management device, information about a user device, to register a user identity attribute request of the user device in the first network device, to commit to a distributed ledger, a first transaction comprising the user identity attribute request, to receive second transactions committed to the distributed ledger by a plurality of second network devices, each second transaction comprising a list of user identity attributes and integrity validation data of the user identity attributes, and to verify the list of user identity attributes comprised in the second transactions, wherein the verify comprises comparing the integrity validation data comprised in a first of the second transactions with the integrity validation data comprised in at least a further one of the second transactions.

In yet a further aspect, there is provided a carrier containing the computer program as summarized above, wherein the carrier is one of an electronic signal, optical signal, radio signal, or computer-readable storage medium.

In a further aspect, there is provided a computer program, comprising instructions which when executed on a second network device, cause the second network device to receive from a distributed ledger, a first transaction, to receive from a user device related to the first transaction, at least a user identity attribute and a proof generated based on the user identity attribute, to receive data from an identity management device, to verify validity of the proof based on the data received from the identity management device, and to commit to the distributed ledger a second transaction comprising a list of user identity attributes and integrity validation data of the user identity attributes.

In yet a further aspect, there is provided a carrier containing the computer program as summarized above, wherein the carrier is one of an electronic signal, optical signal, radio signal, or computer-readable storage medium.

In yet a further aspect, there is provided a system comprising a first network device and a second network device, adapted for communicating data signals between the first network device and the second network device, the system being operative to obtain, at the first network device, information about a user device from an identity management device, register at the first network device, a user identity attribute request of the user device in the first network device, commit by the first network device to a distributed ledger, a first transaction comprising the user identity attribute request, receive at the second network device, from a distributed ledger, a first transaction, receive at the second network device, from a user device related to the first transaction, at least a user identity attribute and a proof generated based on the user identity attribute, receive at the second network device, data from an identity management device, verify at the second network device, validity of the proof based on the data received from the identity management device, commit at the second network device, to the distributed ledger a second transaction comprising a list of user identity attributes and integrity validation data of the user identity attributes, receive at the first network device, second transactions committed to the distributed ledger by a plurality of second network devices, each second transaction comprising a list of user identity attributes and integrity validation data of the user identity attributes, and verify at the first network device, the list of user identity attributes comprised in the second transactions, wherein the verify comprises comparing the integrity validation data comprised in a first of the second transactions with the integrity validation data comprised in at least a further one of the second transactions.

Some embodiments according to the present invention further allow for recovery of the user identity attribute of a user device if the user device does not fulfill the conditions of the initial agreement with a verifying entity (or a first network device).

BRIEF DESCRIPTION OF THE DRAWINGS

For a better understanding of the present disclosure, and to show more readily how it may be carried into effect, reference will now be made, by way of example, to the following drawings, in which.

DETAILED DESCRIPTION

Figure 1:
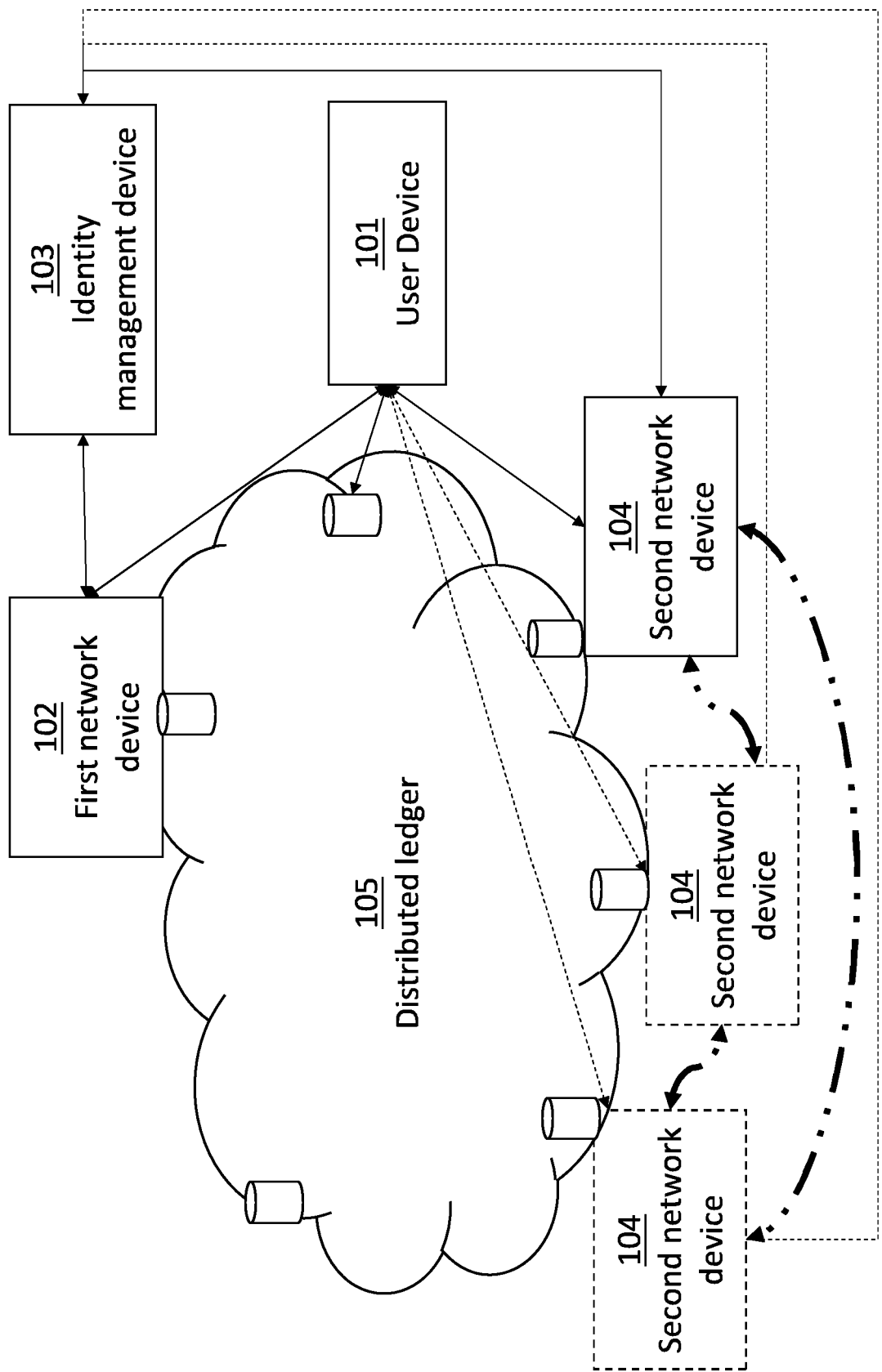
FIG. 1 is a high-level architecture diagram of various entities involved in an identity escrow procedure.

Embodiments will be illustrated herein with reference to the accompanying drawings. These embodiments are provided by way of example so that this disclosure will be thorough and complete, and will fully convey the scope of the inventive concept to those skilled in the art. The drawings are schematic and simplified for clarity, and they merely show details which are essential to the understanding of the embodiments presented herein.

The present document describes techniques relating to use of an identity escrow procedure. An identity escrow procedure may, for example, be a procedure which allows an entity to prove trustworthiness to another entity without revealing extra information in addition to what is required. Any additional information may be revealed under special circumstances, for example in case of abuse of information or if a certain condition has been met. When a verifying entity interacts with a user device, the user device may not intend to disclose a value of the user identity attribute to the verifying entity. Instead the user device intends to share only the list of user identity attributes. On the other hand, the verifying entity may need a guarantee that the identity data (also called as user identity attribute) of the user device may be recovered, if needed, using the services of the identity escrow. Hence, unlike data systems like Sovrin™, which only allow the user to share user data with a service at a given time with no guarantees, the embodiments of the present invention enable provision of a guarantee that the user identity data (or user identity attribute) will be available to access at a later time. In some embodiments, some well-defined conditions need to be fulfilled by the verifying entity in order to access the user identity attribute and the value of the user identity attribute. Such an identity escrow service or a system is designed so that it is not possible to impersonate the user towards the escrow service or compromise the user identity. This is achieved by relying on multiple entities (also called second network devices) to take part in the verification procedures or escrowed certificate generation. The entities may need to collaborate in order to enable the recovery of the identity data of the user device.

Due to the personal nature of user identity data, regulation, such as General Data Protection Regulation, GDPR, impose restrictions on the handling of user identity data. For instance, requiring that user identity data is stored separately from a ledger. Such restrictions impose challenges on accessing user identity data from within a ledger when the user identity data cannot be stored in the ledger. In a public data system like Sovrin™, a user device has control over data stored within the system and can modify or delete the data at any time. As a result, a verifier can only have the guarantee that the data is available at the instance the verifier makes the request, but there is no guarantee that the data will be accessible at a later time. Furthermore, fetching identity data of the user entity may not always be necessary. Instead, an entity which wants to establish a transaction or a service exchange with the user entity, might only want to be assured that it could have access to the identity data of the user entity, if needed, for instance upon a police investigation. Some embodiments disclosed herein integrate the methods of identity escrowing with a distributed ledger, utilizing inter-ledger technologies to fetch data from public ledger in order to provide guarantees on an identity of a user device and possible recovery of the user identity data, while preserving the privacy of the user device within the context of a smart contract running on a blockchain system.

In the present document, the terms 'user entity' and 'user device' may be used interchangeably and refer to any entity being associated with an identity. Although a user identity attribute or any information shared by or with a user device are in relation to a user device, in some scenarios, it is to be understood that such information or the user identity attribute may be in relation to an owner of the user device. For example, if the information shared by a user device are characters indicating a date of birth, such information may be construed as being the date of birth of an owner of the user device. The term 'verifying entity', for example, may refer to a network device, a first network device or a second network device. A user identity attribute may refer to one or more user identity attributes.

In the present document, the term 'smart contract' may refer to a piece of code invoked by a client application external to a blockchain wherein the piece of code manages access to the state of the distributed ledger via a transaction. It may refer to general purpose computation that takes place on a blockchain or distributed ledger.

In the present document, the term 'distributed ledger' can be any kind of distributed or decentralized ledger that supports one or more smart contracts or smart contract functionality or blockchain functionality. The distributed ledger may support the possibility of storing data in a database outside of the distributed ledger while keeping a hash of the data inside the distributed ledger. In case of Hyperledger Fabric, the possibility of storing data in a database outside of the distributed ledger while keeping a hash of the data inside the distributed ledger, is implemented as private data collection. Similarly, in case of Quorum, the possibility of storing data in a database outside of the distributed ledger while keeping a hash of the data inside the distributed ledger, is implemented as private transactions. The implementation may be a native capability or implemented by using the smart contract capabilities or implemented by using blockchain capabilities. The term ledger may also be used, herein, to refer to a distributed ledger.

In the present document, the term 'transaction' may refer to a singular input into a blockchain that affects a change in the blockchain's data. Each transaction in a blockchain is digitally signed by the originator. Each transaction, either singly or in blocks, is chained to a prior transaction via a digital hash wherein a digital hash is an electronic fingerprint of data that is globally unique and extremely difficult to forge. Transaction that are validated are replicated using a consensus algorithm across all machines running the blockchain. In Hyperledger Fabric, transactions are created when a smart contract is invoked from a client application to read or write data from a distributed ledger. As a further example, in cryptocurrency blockchains, each transaction contains a list of digital-currency inputs and outputs, along with metadata, such as a timestamp or optional transaction fee.

In the present document, the term 'identity management device' refers to at least a decentralized identity management device. Such a system typically stores a public profile of a user device in a public distributed ledger, while the private data is maintained inside a wallet under the control of the user device. Public information comprises any information to authenticate a user device as well as an address of a software agent that may be contacted to obtain more information about a user. Information relating to a user device and/or its user is, typically, stored as a user identity attribute in a credential, which credential is issued by trusted organizations (for instance a driving license issued by a country). Such information stored as a user identity attribute, typically, relates to identity information of a user device and/or its user.

A credential may be a data structure comprising a user identity attribute, a value of the user identity attribute plus any public verification key that is bound to a private key of a user device. For example, a passport credential may include user identity attributes such as given name, family name, date of birth, passport number, etc. For example, a user identity attribute could be Given name and a value of the user identity attribute could be Alice.

A user device may provide proof regarding the credential to the third parties, through the software agents. Such a proof may either disclose the content of the credential or assert certain properties. Some examples of decentralized identity management device may include, but are not limited to, Sovrin™, Hyperledger Indy, uPort or Trinsic.

In the present document, the term 'ledger peer' refers to a software program or process used to take part in the distributed ledger operation. A ledger peer may commit a transaction to a distributed ledger or perform message exchanges with other devices. There is one or more ledger peer associated with a user device or a verifying device. The term 'private database' refers to a database attached to a ledger peer, and wherein the database stores data for which an integrity record has been inserted into the distributed ledger. The term ' ledger client' refers to a software program or process through which a user device interacts with a distributed ledger via a connection with a peer.

In the present document, the term 'agent' refers to a software program or process that may be used to contact one or more agents of other entities. For example, the entities may be decentralized identity management devices which decentralized identity management devices are contacted to obtain one or more credentials and/or proofs. In some cases, an agent may be used to interact with the agent's own wallet, interface with one or more agents of other entities, and for generating a proof based on the credential stored in the wallet. Alternatively, the term 'agent' may refer to a software program or process used by or acting on behalf of an entity to interact with one or more other agents or a distributed ledger. An agent may be, for example, of the following types—An edge agent running at the edge of the network on a local device and a cloud agent running remotely on a server or a cloud hosting service. An agent, typically, requires access to a wallet in order to perform cryptographic operations on behalf of the entity they represent.

In the present document, the term 'wallet' refers to a software module, and optionally an associated hardware module, for securely storing and accessing data such as a private key, a link secret, other sensitive cryptographic key material, and other private data used by an entity. A wallet may be accessed by an agent. In the Sovrin™ system, a wallet mainly implements the emerging Decentralized Key Management System (DKMS) standards for interoperable decentralized cryptographic key management.

In the present document, the term 'user agent' refers to an agent of a user device, the term 'user wallet' refers to a wallet of a user device, 'ledger client' refers to a ledger client of a user device. Similarly, the term 'first agent' refers to an agent of a first network device, the term 'first private database' refers to a private database of a first network device, 'first ledger client' refers to a ledger client of a first network device, 'first ledger peer' refers to a ledger peer of a first network device. Similarly, the term 'second agent' refers to an agent of a second network device, the term 'second private database' refers to a private database of a second network device, 'second ledger peer' refers to a ledger peer of a second network device.

In the present document, the term 'commit' refers to writing or appending a block to a distributed ledger. A block may refer to a single section of discrete data. A block typically comprises a list of transactions or actions to be performed when processing the data in the block.

FIG. 1 shows an example architecture for an identity escrow service in a smart contract context running on a blockchain, comprising at least a distributed ledger 105, a user device 101, a first network device 102, a plurality of second network devices 104, and an identity management device 103. The arrows in FIG. 1 represent the interaction between the various entities of the architecture. The arrows in FIG. 2a, FIG. 2b, FIG. 3a and FIG. 3b depict the interaction between various components comprised in different entities of FIG. 1 wherein the interaction may include sending and/or receiving messages. A message may, for example, refer to a piece of data that represents an essential semantic intent of a communication. A message may, for example, comprise payload and/or signaling information. A message may, for example, be encrypted, wrapped, packaged, or transformed. The message comprising a payload or a user identity attribute may be encrypted, for example, using Transport Layer Security (TLS). The message may, for example, be an application layer message. For example, two parties that want to connect in the Sovrin™ ecosystem need to exchange a message of type "Connection Request", wherein such a message may comprise payload such as endpoint address of the parties.

Figure 2A:
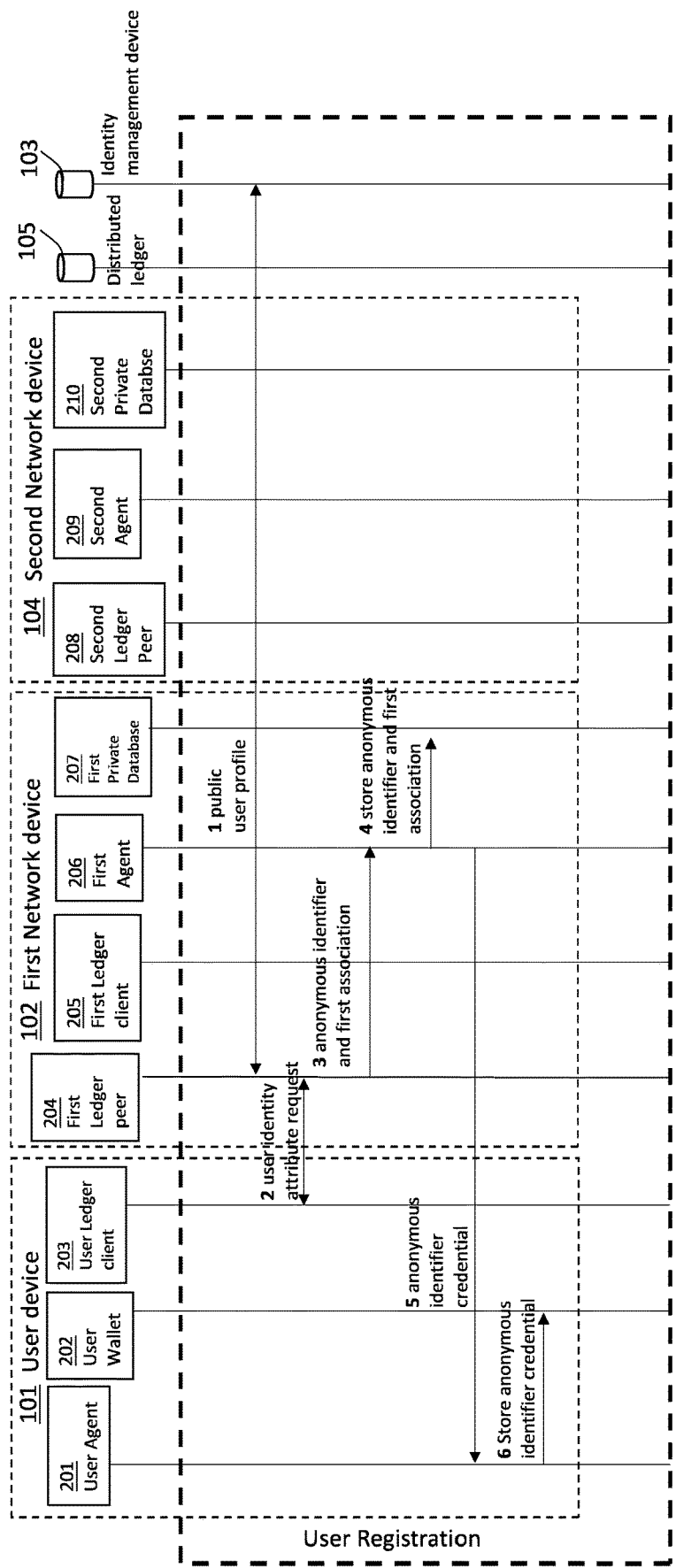
FIG. 2a depicts the message exchanges between the various entities involved in the identity escrow procedure according to a scenario.
Figure 2B:
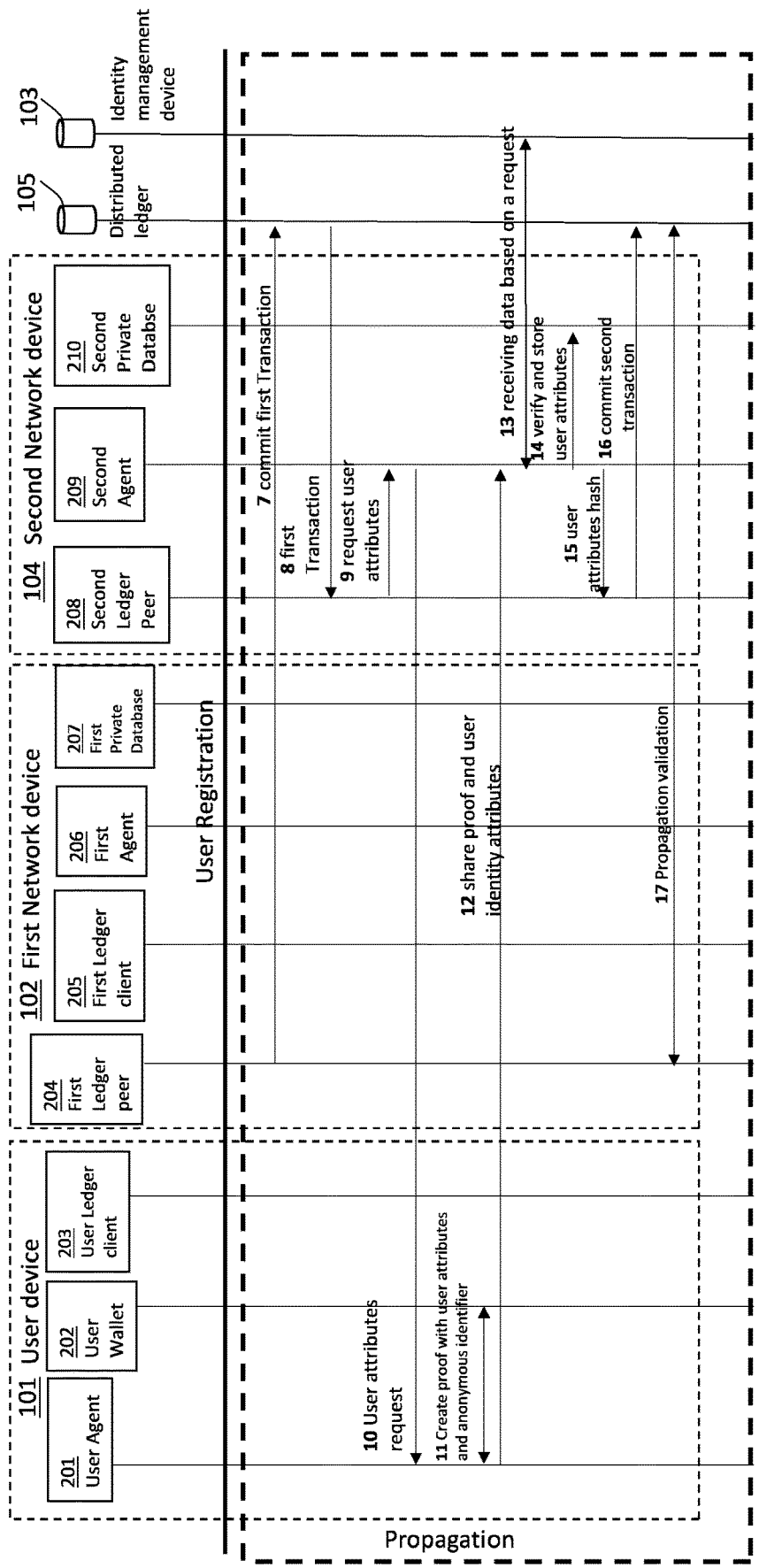
FIG. 2b depicts the message exchanges between the various entities involved in the identity escrow procedure according to a scenario.
Figure 3A:
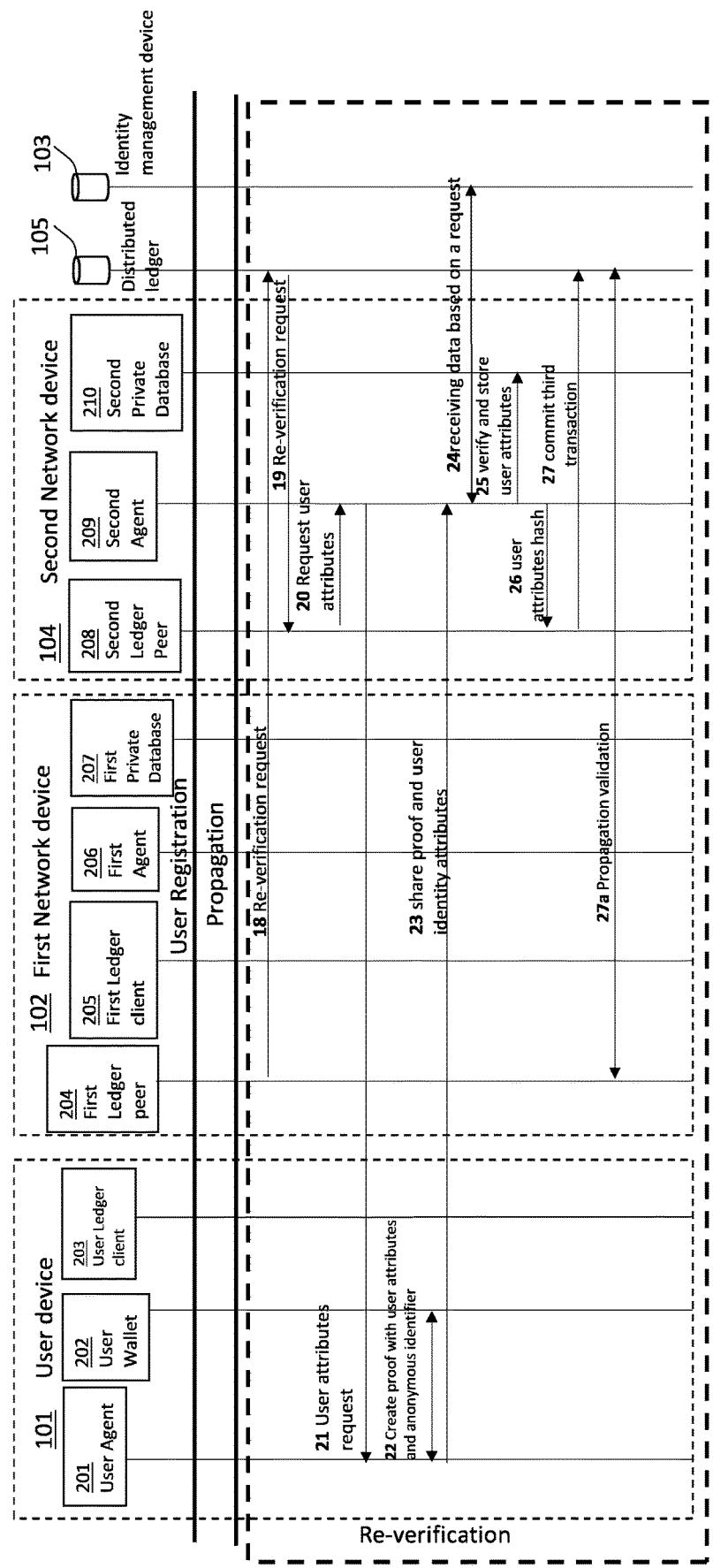
FIG. 3a depicts the message exchanges between the various entities involved in the identity escrow procedure according to an example scenario.
Figure 3B:
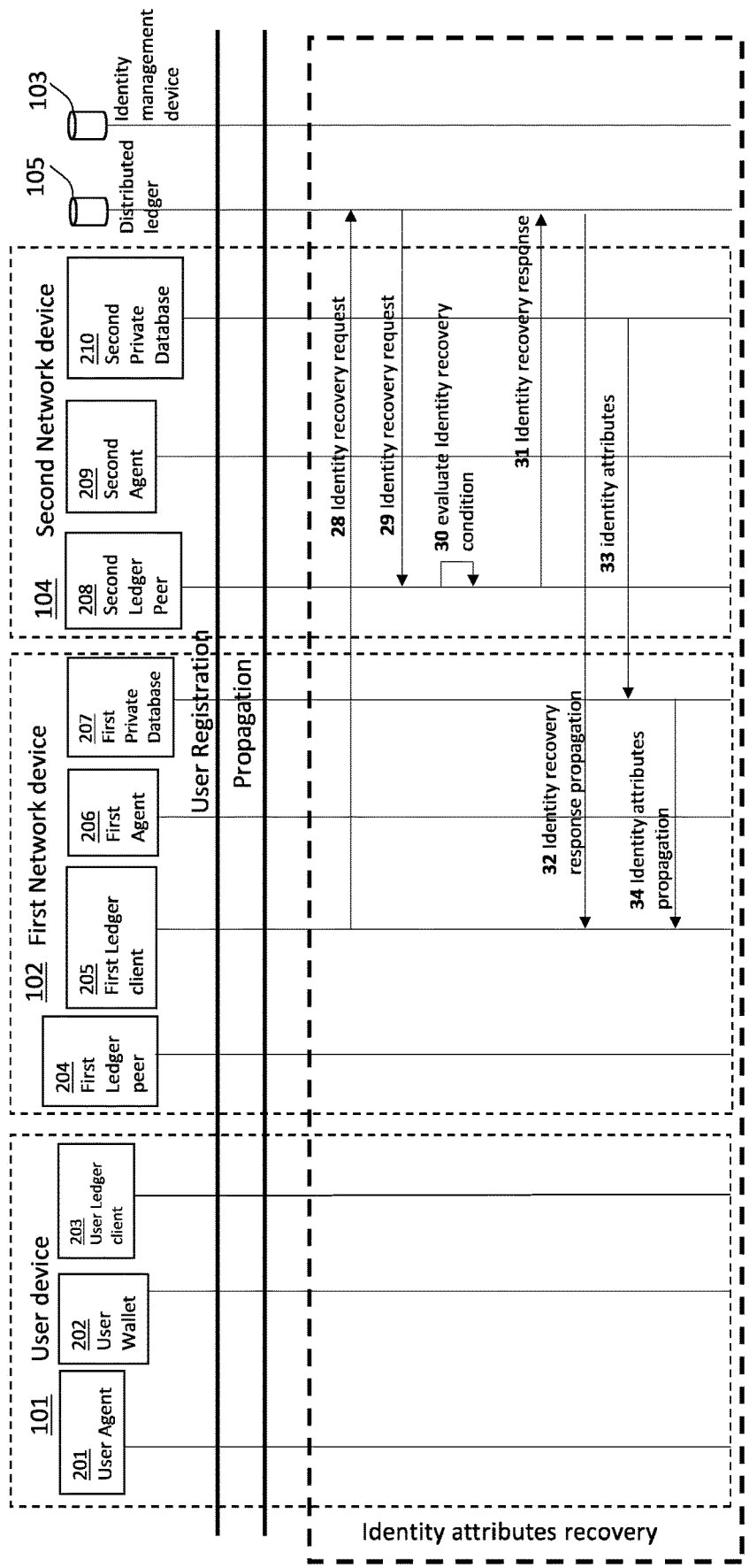
FIG. 3b depicts the message exchange between the various entities involved in the identity escrow procedure according to an example scenario.

In an embodiment as depicted in FIG. 1, the first network device 102, the second network devices 104 and the user device 101 are part of the distributed ledger 105. FIG. 2a depicts an embodiment describing a User Registration scenario. FIG. 2b depicts an embodiment describing a Propagation scenario following the steps performed in the User Registration scenario. FIG. 3a depicts an embodiment describing a Re-verification scenario following the steps performed in the User Registration scenario and the Propagation scenario. FIG. 3b depicts an embodiment describing a Identity Attributes Recovery scenario following the steps performed in the User Registration scenario and the Propagation scenario.

In an embodiment, a first network device 102 may request information about the user device 101 from an identity management device 103. The first network device first sends a request for information such as a public identity of the user device 101 to an identity management device 103 and then receives the requested information from the identity management device 103. For example, according to one embodiment as depicted in FIG. 2a, as illustrated with arrow 1 public user profile, a first ledger peer 204 requests information such as a public identity of the user device 101 from an identity management device 103. The arrow 1 public user profile may include sending and/or receiving of messages of a type, for example, JavaScript Object Notation, JSON, over Hypertext Transfer Protocol, HTTP, POST. In Hyperledger Indy or Sovrin™, such messages are in the form of a request namely: a read request and a write request. The request may have a structure such as a common request structure, a reply structure for write request or a reply structure for read request. Below, an example format of a read request for fetching a public verification key from an identity management device such as Hyperledger Indy is provided.

```
{
    'operation': {
        'type': '109'
        'signature_type': 'CL',
        'origin': '2VkbBskPNNyWrLrZq8GBhk',
        'ref': 11,
        'tag': 'any_tag',
    },
    'identifier': 'L5AD5g65TDQr1PPHHRoiGf',
    'reqId': 1514395388470904,
    'protocolVersion': 2
}
```

In an embodiment, the arrow 1 public user profile may indicate that the first ledger peer 204 first sends, to an identity management device 103, a request for information such as a public identity of the user device 101 and then receives the requested information from the identity management device 103. The information may additionally comprise information such as
- public verification keys of the user device 101,
- public verification keys of the first network device 102,
- identifiers of the user device 101 wherein the identifiers may be cryptonyms,
- distributed identifier of the user device 101 wherein the distributed identifier has no cryptographic properties
- proof relating to user device 101, wherein the proof may be non-correlatable. An example of a non-correlatable proof, for a user identity attribute date of birth, is a pseudonym, such as, greater than age twenty-one.
- a digital assertion or attestation made by a user device 101 or another device about the user device 101. The digital assertion may be
  - Self-asserted i.e. digital assertion asserted by a user device 101 itself
  - Verifiable i.e. digital assertion made by other devices or entities The information may further comprise address of a user wallet 202 of the user device 101 and/or any other piece of information related to authenticating the user device 101.

In an embodiment, a first network device 102 initiates registration for user device 101 with a user device 101 and registers a user identity attribute request in the first network device 102. In other words, the first network device 102 first sends, to the user device 101, a user registration initiation message for initiating a registration for a user device 101. The user device 101 responds by sending a user identity attribute request message comprising a user identity attribute request. For example, as illustrated with arrow 2 user identity attribute request, the first ledger peer 204 initiates registration for user device 101 with a user device 101 and registers a user identity attribute request. The arrow 2 user identity attribute request may include sending and/or receiving of messages, for example the user registration initiation message and the user identity attribute request message, of a type JSON over HTTP POST. The user identity attribute request may be of a type such as Array<information>.

In some embodiments, the user device 101 initiates registration with the first network device 102 by sending a user identity attribute request message comprising a user identity attribute request. The first network device 102 then registers the user identity attribute request in the first network device 102.

Registering a request includes at least receiving and storing the request, for example, a user identity attribute request. It may also, further, include acting upon the request. It may be noted that, in some embodiments, arrow 1 public user profile may be performed after arrow 2 user identity attribute request.

The content of user identity attribute request may be information relating to, for example, a user identity attribute to be provided to the plurality of second network devices 104, a condition to be fulfilled for recovery of the user identity attribute of the user device 101, and a split of the user identity attributes of the user device 101 among a plurality of second network devices 104. The content of the user identity attribute request may further be information relating to second network devices such as IP address of the second network devices or IP address of second agents. In the application, in order to simplify the description, the term second network devices 104 will be used to refer to a single, as well as to a plurality of second network devices 104.

The user identity attribute request may comprise request attributes. Table 1 shows an example list of request attributes that could be included in the user identity attribute request, wherein the user identity attribute request may be sent or received as indicated by arrow 2 user identity attribute request

TABLE 1

Example list of request attributes comprised in the user identity attribute request

| Request Attribute | Description |
|---|---|
| Target | Pointer to an attribute from a schema, for example as in the Sovrin ™ identity management system |
| Recovery Condition | Function taking as input the state of the distributed ledger 105 and outputting a Boolean, representing whether or not the recovery condition for a user identity attribute is fulfilled |
| Entity Escrowing Policy (EEP) | Policy representing the entities (Ent) that are to escrow the attribute. EEP is in the form of a Boolean expression that needs to be true for the policy to be fulfilled. For eg: (Ent1 AND (Ent2 OR Ent3)) AND (Ent5 OR Ent6) |

In an embodiment, the Recovery Condition, RC, as described in Table 1, may be used to indicate the fulfillment of a condition regarding recovery of the user identity attribute. In an embodiment, the Recovery Condition, RC, may encode any condition that is computed based on the state of the distributed ledger 105. The RC function could, for example, check if a money exchange took place between the user device 101 and a first network device 102, the condition thus being if a money exchange took place. The RC function could, additionally or alternatively, check if a predefined message, signed by a private key, has been inserted in the distributed ledger 105. The RC function could, if desired, check for any other condition regarding recovery of the user identity attribute. The user identity attribute request may further comprise information relating to splitting of user identity attributes among different verifying entities. For example, the information could be which user identity attribute is stored in which verifying entity. and/or the number of user identity attributes stored by each verifying entity. The user identity attribute request may still further comprise information relating to the number of copies of each split part that is to be stored in the verifying entities. A verifying entity could be, for example, a second network device 104.

A technical effect of the interaction between the first network device 102 and the user device 101, as indicated by arrow 2 user identity attribute request, is that such registration can be carried out under the user device's 101 own authority, whereby only relevant user identity attributes or a list of user identity attributes may be disclosed as needed by a verifying entity or any entity with which a service is established, thus providing enhanced privacy and control to the user device over its user identity attributes.

The text in "Sovrin: What Goes on the Distributed ledger 105?", Andrew Tobin, Evernym, Original April 2017, updated September 2018, is referred to, to describe certain terms used in the application. The user identity attribute may be associated with at least one of the following definitions, namely, schema and credential. Table 2 shows an example list of user identity attributes which may be included in the user identity attribute request. It may be noted that the list of the user identity attributes comprised in the user identity attribute request may include a list of names associated with user identity attributes but may not include a value of the user identity attributes. For example, if a user identity attribute Date of Birth has a value of the user identity attribute 01/01/2000, then the name associated with the user identity attribute i.e. Date of Birth is included and not the value of the user identity attribute i.e. 01/01/2000.

TABLE 2

Example List of user identity attributes comprised in the user identity attribute request

| User identity Attribute | Description |
| --- | --- |
| First Name | First given name of an owner or a user of a user device, such information being made available to the user device. |
| Last Name | Last given name of an owner or a user of a user device |
| Date of birth | Date of birth of an owner or a user of a user device |
| Residential address | Address of an owner or a user of a user device |

In an embodiment, a first network device 102 generates an anonymous identifier and shares the anonymous identifier with the user device 101. For example, as illustrated by arrow 3 anonymous identifier and first association of FIG. 2a, the first ledger peer 204 generates an anonymous identifier for the user device 101 and stores in the first agent 206 at least one of an anonymous identifier and a first association between the information of the user device obtained from the identity management device, and the generated anonymous identifier. The arrow 3 anonymous identifier and first association may include sending and/or receiving of messages of a type, for example, JSON over HTTP POST.

As illustrated by arrow 4 store anonymous identifier and first association, the first agent 206 further stores in a first private database 207 at least one of, the anonymous identifier, and the first association. The arrow 4 store anonymous identifier and first association may include sending and/or receiving of messages of a type, for example, JSON over HTTP PUT and/or My Structured Query Language, MySQL, over Transmission Control Protocol, TCP.

In some embodiments, the anonymous identifier is generated based on information obtained from the identity management device 103. In some embodiments, the anonymous identifier may be for example a random number, a character or a combination of number(s) and character(s). In an embodiment, the anonymous identifier may be generated, for example, by use of a hardware random-number generator or by a pseudo-random number generator. The anonymous identifier is associated with the user device 101. In some embodiments, the first association between the information of the user device 101 obtained from the identity management device 103 and the anonymous identifier generated by the first ledger peer 204 may be stored in both the first agent 206 and the first private database 207.

In an embodiment, an anonymous identifier credential is generated by a first network device 102 and is sent to a user device 101 from the first network device 102. For example, as illustrated with arrow 5 anonymous identifier credential, an anonymous identifier credential is generated by the first agent 206 comprising the first association and sent to the user agent 201. The arrow 5 anonymous identifier credential may include sending and/or receiving of messages of a type, for example, JSON over HTTP POST and/or JSON over WebSocket. In an embodiment, the anonymous identifier credential may be generated by the first agent 206 based on an association between the user device 101 and the anonymous identifier, wherein the association is not derived from the information received from the decentralized identity management device 103.

As illustrated with arrow 6 store anonymous identifier credential, the user agent 201 stores the anonymous identifier credential in a user wallet 202. The arrow 6 store anonymous identifier credential may include sending and/or receiving of messages of a type, for example, JSON over HTTP POST and/or C-Callable function as described in *Aries* wallet. This denotes the end of the user registration of FIG. 2a.

In an embodiment, the first network device 102 commits a first transaction to the distributed ledger 105. For example, as depicted in FIG. 2b, Propagation scenario begins with arrow 7 Commit First Transaction, i.e. the first ledger peer 204 committing a first transaction to the distributed ledger 105, the first transaction comprising a user identity attribute request. The arrow 7 Commit First Transaction may include sending and/or receiving of messages of a type, for example, JSON Remote Procedure Call, JSON-RPC, over HTTP POST and/or Protocol buffers over gRPC. The user identity attribute request further comprises information regarding the user device registration such as, information relating to a user identity attribute to be provided to a plurality of second network devices 104, a condition to be fulfilled for recovery of the user identity attribute of the user device 101, and a split of user identity attributes of the user device 101 among a plurality of second network devices 104. In an embodiment, the first transaction may still further comprise an address of a user agent 201. The address of the user agent 201 may be for example an IP address.

In some embodiments, the second network device 104 receives a first transaction from the distributed ledger 105. For example, as illustrated with arrow 8 first transaction, the second ledger peer 208 receives the first transaction from the distributed ledger 105. The arrow 8 first transaction may include sending and/or receiving of messages of a type, for example, Protocol buffers over gRPC and/or JSON over WebSocket. It may be noted that the first transaction may be received by second network devices 104 involved in the verification of the user identity attribute as per one or more conditions comprised in the user identity attribute request between the user device 101 and the first network device 102.

As illustrated with arrow 9 request user attributes, the second ledger peer 208 requests the second agent 209 to obtain the user identity attribute and/or a value of the user identity attribute from the user agent 201 based on the information comprised in the first transaction. The arrow 9 request user attributes may include sending and/or receiving of messages of a type, for example, JSON over HTTP POST.

In an embodiment, the second network device 104 may request the user identity attribute and/or a value of the user identity attribute from a user device 101. For example, as illustrated with arrow 10 user attribute request, the second agent 209 may request the user identity attribute and/or a value of the user identity attribute from the user agent 201. The arrow 10 user attribute request may include sending and/or receiving of messages of a type, for example, JSON over HTTP POST and/or JSON over WebSocket. In an embodiment, the second network device 104 authenticates itself towards the user device 101 at the time of requesting the user identity attribute and/or a value of the user identity attribute. The user device 101 may further apply access control to the access of the user identity attribute and/or a value of the user identity attribute as per the conditions comprised in the user identity attribute request, indicated by interaction arrow 2 user identity attribute request, between the user device 101 and the first network device 102. In an embodiment, the user attribute request, as illustrated by arrow 10, may further comprise information such as an IP address of the second agent 209 and/or an identifier identifying the second network device 104.

In an embodiment, user device 101 generates proof based on the requested user identity attribute and the anonymous identifier generated in the user registration of FIG. 2a and stores the anonymous identifier in the user wallet 202. For example, as illustrated with arrow 11 create proof with user attributes and anonymous identifier, the user agent 201 generates proof based on the requested user identity attribute and the anonymous identifier generated during the user registration of FIG. 2a. The user agent 201 stores the anonymous identifier in the user wallet 202. The arrow 11 create proof with user attributes and anonymous identifier may include sending and/or receiving of messages of a type, for example, JSON over HTTP POST and/or C-Callable function. The anonymous identifier may be retrieved from the user wallet 202 at a later time.

The proof is used by the user device 101 to identify itself or its user towards the second network device 104 and/or to provide a certification to the second network device 104 that the user identity attribute of the user device 101 is valid.

In an embodiment, the proof may be associated with the anonymous identifier generated during the user registration phase. In an embodiment, the proof may be generated based on the user identity attribute. The proof, comprising the anonymous identifier, is then sent to the second network devices 104. In some embodiments, the user identity attribute is sent to the second network devices 104, along with the proof and the anonymous identifier, as illustrated with arrow 12 share proof and user identity attributes.

The proof generation of step 11, wherein the proof comprises the anonymous identifier, is to ensure that the user identity attribute, when provided to the plurality of second network devices 104, refer to the same user device 101 without violating the privacy of the user device 101. The proof generation further helps in showing that the user identity attribute has been certified by a known and trusted entity. The proof illustrated by arrow 11 may have one or more of the following characteristics:
- A proof may disclose some attributes, prove other attributes, or ignore attributes entirely.
- A proof is unique and context-specific; a proof may not be reused in other interactions besides the one between second network devices 104 and user device 101.
- The anonymous identifier used to generate a proof guarantees that each source credential belongs to the same user device. A proof may include a zero-knowledge proof stating that the proof has not been revoked.
- A proof may include zero-knowledge proof with a presenter of the proof being in the set of authorized second network devices 104 and user device 101.
- A proof may be a digital signature such as an RSA digital signature, external proof or a linked data signature. If a digital signature is used as a proof, the proof is expected to include a signature, a reference to the signing entity or the user device 101, and a representation of the signing date.

The proof generation may include using a proof mechanism, for example, Linked Data Proofs ("*Linked Data Proofs*". Manu Sporny, Dave Longley. Digital Verification Community Group. CG-DRAFT), Linked Data Signatures ("*Linked Data Signatures*", Manu Sporny, Dave Longley. Digital Verification Community Group. CG-DRAFT), 2018 RSA Signature Suite ("*The* 2018 *RSA Linked Data Signature Suite*", Manu Sporny, Dave Longley, Digital Verification Community Group, CG-DRAFT), and JSON Web Signature (JWS) Unencoded Payload Option "*JSON Web Signature (JWS)Unencoded Payload Option*, M. Jones, IETF, February 2016, Proposed Standard."

In an embodiment, the user device 101 sends the proof comprising the anonymous identifier and the user identity attribute, to the second network devices 104. In an embodiment, the user device 101, additionally, sends a value of the user identity attribute to the second network devices 104. For example, as illustrated with arrow 12 share proof and user identity attributes, the user agent 201 sends the proof comprising the anonymous identifier, the user identity attribute and/or the value of the user identity attribute, to the second agents 209. The arrow 12 share proof and user identity attributes may include sending and/or receiving of messages of a type, for example, JSON over HTTP POST and/or JSON over WebSocket. Second network devices 104, who receive a proof comprising the anonymous identifier, the user identity attribute and/or the value of the user identity attribute from the user device 101, may obtain the public verification keys and verify the origin and integrity of the proof and/or the user identity attribute.

In an embodiment, the second network devices 104 send a request, to an identity management device 103, for receiving data in order to validate the proof. The second network devices 104 receive the requested data from the identity management device 103. For example, as illustrated with arrow 13 receiving data based on a request, the second agent 209 sends a request, to an identity management device 103, for receiving data in order to validate the proof. The second agent 209 receives the requested data from the identity management device 103. The arrow 13 receiving data based on a request may include sending and/or receiving of messages of a type, for example, JSON over HTTP POST.

In an embodiment, the second network devices 104 verify the validity of the proof generated by the user device 101 based on data received from an identity management device 103. For example, as illustrated with arrow 14 verify and store user attributes, the second agent 209 verifies the validity of the proof generated by the user device 101 based on data received from an identity management device 103. The second agent 209 stores the user identity attribute in the second private database 210. Additionally, the second agent 209 may store the value of the user identity attribute in the second private database 210. The arrow 14 verify and store user attributes may include sending and/or receiving of messages of a type, for example, JSON over HTTP PUT as in CouchDB and/or MySQL over TCP.

A second network device 104 stores the user identity attribute in the second private database 210. Additionally, a second network device 104 may store the value of the user identity attribute in the second private database 210. The verifying 504 may comprise, for example, certifying the user identity attribute with an identity management device 103. Additionally, the second network device 104 may receive data from the identity management device 103 to verify 504 validity of the proof. The second network device 104 may send a request to the identity management device 103 for receiving data, wherein the request for data may comprise a request for credential and accumulators used to track the revocation of the credential. The request for data may, alternatively, comprise requesting information such as
- public verification keys of the user device 101, including public verification key metadata comprising information related to expiration time, key owner, or key purpose.
- public verification keys of the first network device 102, identifiers of the user device 101 wherein the identifiers may be cryptonyms, distributed identifiers of the user device 101 wherein the distributed identifiers have no cryptographic properties non-correlatable proofs relating to user device 101. An example of a non-correlatable proof, for a user identity attribute date of birth, is a pseudonym, such as, greater than age twenty-one.

a digital assertion or attestation made by a user device 101 or another device about the user device 101. The digital assertion may be Self-asserted, i.e. a digital assertion asserted by a user device 101 itself Verifiable i.e. a digital assertion made by other devices or entities A second network device 104 may use the data received from the identity management device 103 to verify 504 validity of the proof by using content integrity mechanism, such as, hash link or verifiable data registry. In an embodiment, the verifying 504 includes using the public verification key of the user device 101 to verify the validity of the proof, wherein the proof is a digital signature. The proof could, further, be attached to the user identity attribute. In another embodiment, the verifying 504 includes using information comprised in the proof such as, a date and/or a time before which the credential should not be considered verified. In another embodiment, the verifying 504 may include using information comprised in the proof such as, an expiration time associated with a user identity attribute. In yet another embodiment, the verifying 504 may include comparing the anonymous identifier comprised in the first transaction (arrow 7 of FIG. 2*b*) with the anonymous identifier comprised in the proof sent from the user device 101 (arrow 23 of FIG. 3*a*), and further determining if both the anonymous identifiers are same.

As illustrated with arrow 15 user attributes hash, the second agent 209 sends, to the second ledger peer 208, integrity validation data. The integrity validation data may be a result of applying a cryptographic hash function to the user identity attribute. The integrity validation data could, for example, comprise a hash value of the user identity attribute. The arrow 15 user attributes hash may include sending and/or receiving of messages of a type, for example, JSON over HTTP POST. In some embodiments, the integrity validation data may be created as a result of using a cyclic redundancy check or checksum mechanism on the user identity attribute. By use of the integrity validation data, the user identity attribute may be protected.

As illustrated with arrow 16 commit second transaction, a second transaction relating to the first transaction is committed to the distributed ledger 105 by the second ledger peer 208 comprising the integrity validation data and a list of user identity attributes. The arrow 16 commit second transaction may include sending and/or receiving of messages of a type, for example, Protocol buffers over gRPC and/or JSON-RPC over HTTP POST. In an embodiment, one among the plurality of second network devices 104 commits a second transaction relating to the first transaction, the second transaction comprising the integrity validation data as well as the list of identity attributes of all the second network devices 104 participating in the verification. In another embodiment, every individual second network device 104 participating in the verification commits a second transaction to the distributed ledger 105, wherein the second transaction relates to the first transaction. The second transaction may further comprise the integrity validation data and the list of user identity attributes.

In an embodiment, the first network device 102 receives, from the distributed ledger 105, the second transactions committed to the distributed ledger 105 by the second network devices 104 and confirms the reception. For example, as illustrated with arrow 17 propagation validation, the first ledger peer 204 receives, from the distributed ledger 105, the second transactions committed to the distributed ledger 105 by the second network devices 104 and confirms the reception. The arrow 17 propagation validation may include sending and/or receiving of messages of a type, for example, Protocol buffers over gRPC and/or JSON over Websocket. The first network device 102 verifies the list of user identity attributes comprised in the second transactions, wherein the verifying 405 comprises comparing the integrity validation data comprised in a first of the second transactions with the integrity validation data comprised in at least a further one of the second transactions. The second network devices 104 may each commit a single second transaction, or a single second network device 104 may commit multiple second transactions. In some embodiments, it may be that a second transaction may be split and committed as multiple smaller second transactions which are received by the first network device 102. Furthermore, in an embodiment, verifying 405 the list of user identity attributes may be performed by comparing with each other, all the integrity validation data comprised in all second transactions. In some other embodiment, the verifying 405 may be performed by comparing with integrity validation data comprised only in a subset of the total second transactions. The verification may be performed to attest that the user identity attribute stored or escrowed by the second network devices 104 are the same and not modified since the time the second network devices 104 each obtained, from the user device 101, the user identity attribute. In an embodiment, the verifying 405 a list of user identity attributes may include verifying the user identity attributes.

In an embodiment, the verifying the list of user identity attributes, as illustrated by arrow 17 propagation validation, may be performed by use of a consensus mechanism involving the first network device 102 and the second network devices 104. In some embodiments, the consensus mechanism includes at least three second network devices 104. In some embodiments the first network device 102 executes the consensus mechanism. In some other embodiments, the first network device 102 delegates the execution of the consensus mechanism to a second network device 104 or multiple second network devices 104 or other devices which are part of the distributed ledger 105. In case of delegation to other devices, the result of the execution of the consensus mechanism is sent back to the first network device 102 by the devices executing the consensus mechanism. The consensus mechanism may comprise using a function that takes the integrity validation data of the second network devices 104 as input and returns a Boolean indicating if consensus is reached. If consensus is reached, the function points to the integrity validation data that is agreed upon by the devices participating in the execution of the consensus mechanism. In some embodiments, the consensus mechanism includes indicating that consensus has been reached only if all the integrity validation data of the second network devices 104 match. In some other embodiments, the consensus mechanism includes indicating that consensus has been reached if more than half of the integrity validation data of the second network devices 104 match. In some alternative embodiments, where not all the integrity validation data are identical, some additional checks may be carried out to perform the verification including a re-verification. A re-verification may include performing a verification for a second time. For example, the first network device 102 sends a request for re-verification and/or a request for the latest list of user identity attribute so that, for instance, a re-verification of a list of user identity attribute may be performed. The list of user identity attributes may be same or different from a previous list of user identity attributes used for verification. In an embodiment, the re-verification may further include re-verification of one or more user identity attributes. In an embodiment, the re-verification may include re-verification of the integrity validation data of the user identity attributes. The re-verification may, further, be performed to obtain a latest list of user identity attributes or to obtain one or more latest user identity attributes.

Once the verification or re-verification is completed, the first network device 102 may perform further additional steps based on the outcome of the verification. If the verification outcome is positive, indicating that the user device 101 or the user identity attribute is verified, the first network device 102 may establish a further transaction, or initiate an exchange of services between the user device 101 and the first network device 102. If the verification fails, for example, if consensus is not reached among the second network devices 104, the first network device 102 may initiate a re-verification. If the re-verification also fails, in an embodiment, the first network device 102 may not perform any further transaction or exchange of services with the user device 101. In another embodiment, the first network device 102 may still further identify the user device 101 as an untrusted device. In yet another embodiment, the first network device 102 may still further provide an authority, like a law enforcement agency, with information indicating that the user device 101 is an untrusted device.

FIG. 3a depicts an embodiment of the message exchanges or interactions between the entities for the scenario Re-verification. It may be noted that the message exchanges of User Registration and Propagation as depicted in FIG. 2a and FIG. 2b respectively are to be performed prior to performing the message exchanges for the scenario of Re-verification.

In an embodiment, a first network device 102 sends a re-verification request to the distributed ledger 105. The re-verification request comprises a request for re-verification of a list of user identity attributes along with a session ID or a transaction ID relating to the first transaction. For example, as illustrated with arrow 18 re-verification request FIG. 3a, a first ledger peer 204 sends a re-verification request to the distributed ledger 105. The re-verification request is further received, from the distributed ledger 105, by the second network devices 104. The second network devices 104 may have participated in a previous first transaction, as depicted by arrow 8 of FIG. 2b. The arrow 18 re-verification request may include sending and/or receiving of messages of a type, for example, Protocol buffers over gRPC and/or JSON-RPC over HTTP POST.

The re-verification request further comprises the information comprised in the first transaction including user device registration comprising an address of a user agent 201 wherein the address may be an IP address, information related to splitting of user identity attributes among different verifying entities and the recovery condition of the user identity attribute. As illustrated with arrow 19 re-verification request, a second ledger peer 208 further receives the re-verification request from the distributed ledger 105. The arrow 19 re-verification request may include sending and/or receiving of messages of a type, for example, Protocol buffers over gRPC and/or JSON over Websocket. The re-verification request may be sent to initiate a re-verification in the second network devices 104 in case of a change in value of the user identity attribute of the user device 101. It may be noted that, while in some embodiments, re-verification may be performed in a different transaction than the first transaction, in some other embodiments the re-verification may be performed as part of the first transaction. The next steps of Re-verification namely arrows 20, 21, 22, 23, 24, 25, 26, 27 and 27a of FIG. 3a follow the same procedure as in the Propagation of FIG. 2b starting from arrow 9 request user attributes and ending at arrow 17 Propagation validation. It may be noted that the arrows 20, 21, 22, 23, 24, 25, 26, 27 and 27a may include sending and/or receiving of messages of a type, for example, same as the type for arrows 9, 10. 11. 12. 13. 14. 15. 16 and 17 respectively. It may be noted that the arrow 27 commit third transaction follows the same procedure as described for arrow 16 commit second transaction.

FIG. 3b depicts the message exchanges between the entities for the scenario Identity attributes recovery. It may be noted that the message exchanges of User Registration and Propagation as depicted in FIG. 2a and FIG. 2b respectively are to be performed prior to performing the message exchanges for the scenario of Identity attributes recovery.

In an embodiment, a first network device 102 sends an identity recovery request message to the distributed ledger 105, to be received by second network devices 104. For example, as depicted by Identity attributes recovery of FIG. 3b, illustrated with arrow 28 Identity recovery request, a first ledger client 205 sends an identity recovery request to the distributed ledger 105, to be received by second network devices 104. The arrow 28 Identity recovery request may include sending and/or receiving of messages of a type, for example, Protocol buffers over gRPC and/or JSONRPC over HTTP POST. The second network devices 104 may be participating in a current transaction with the first network device 102 or may have participated in a previous transaction with the first network device 102. The second network devices 104 receive the identity recovery request and evaluate the conditions for recovering the user identity attribute.

In an embodiment as illustrated with arrow 29 Identity recovery request, the second ledger peer 208 receive from the distributed ledger 105, the identity recovery request. The arrow 29 Identity recovery request may include sending and/or receiving of messages of a type, for example, Protocol buffers over gRPC and/or JSON over Websocket.

As illustrated with arrow 30 Evaluate identity recovery condition, the second ledger peers 208 or the second network devices 104 evaluate the conditions for recovering the user identity attribute. While in some embodiments the RC request attribute, as mentioned in Table 1, is comprised in the user identity attribute request, in some other embodiments, the RC request attribute may, additionally or alternatively, be comprised in the identity recovery request. The evaluation may further comprise evaluating the RC request attribute if comprised in the identity recovery request. In an embodiment the evaluation comprises evaluating based on consensus mechanism similar to the verification step, as illustrated by arrow 17 propagation validation. The consensus may be carried out using a smart contract.

As illustrated with arrow 31 identity recovery response, a response of the evaluation is sent to the distributed ledger. The arrow 31 identity recovery response may include sending and/or receiving of messages of a type, for example, Protocol buffers over gRPC and/or JSON-RPC over HTTP POST. If the evaluation is positive, a positive response is committed to the distributed ledger 105 by the second network device 104. The positive response may indicate that the first network device 102 is authorized to access the user identity attribute. A positive response may further require that the user identity attribute is sent to the first network device 102 from the second network device 104. In an embodiment, the first network device 102 may send a request to the second network device 104 to access the user identity attribute of the user device (101). The second network device 104 may further disclose to the first network device 102 the user identity attribute upon receiving information on recovery condition being fulfilled. Additionally, the second network device 104 may further disclose to the first network device 102 a value of the user identity attribute upon receiving information on recovery condition being fulfilled. The second network device 104 may receive the information on recovery condition being fulfilled via the RC request attribute. The second network device 104 may have an address to send the user identity attribute to the first network device 102, wherein the address may be an IP address.

As illustrated with arrow 32 identity recovery response propagation, the response is received by the first ledger client 205 from the distributed ledger 105. The arrow 32 identity recovery response propagation may include sending and/or receiving of messages of a type, for example, Protocol buffers over gRPC and/or JSON over WebSocket.

In an embodiment, the user identity attribute is sent to a first private database 207 from a second private database 210, as illustrated with arrow 33 identity attributes. The arrow 33 identity attributes may include sending and/or receiving of messages of a type, for example, Protocol buffers over gRPC and/or JSON over HTTP PUT and/or MySQL protocol over TCP. It may be noted that the user identity attribute is not committed to the distributed ledger (105) but rather are sent directly to the first private database 207 from the second private database 210. This is an advantage as it enhances the privacy of the user device by disclosing the user identity attribute (and a value of the user identity attribute) to only those devices which have been authorized or verified to receive the user identity attribute of the user device. As illustrated with arrow 34 identity attributes propagation, the user identity attribute may be sent from the first private database 207 to the first ledger client 205. The arrow 34 identity attributes propagation may include sending and/or receiving of messages of a type, for example, JSON over HTTP POST and/or MySQL protocol over TCP.

Figure 4:
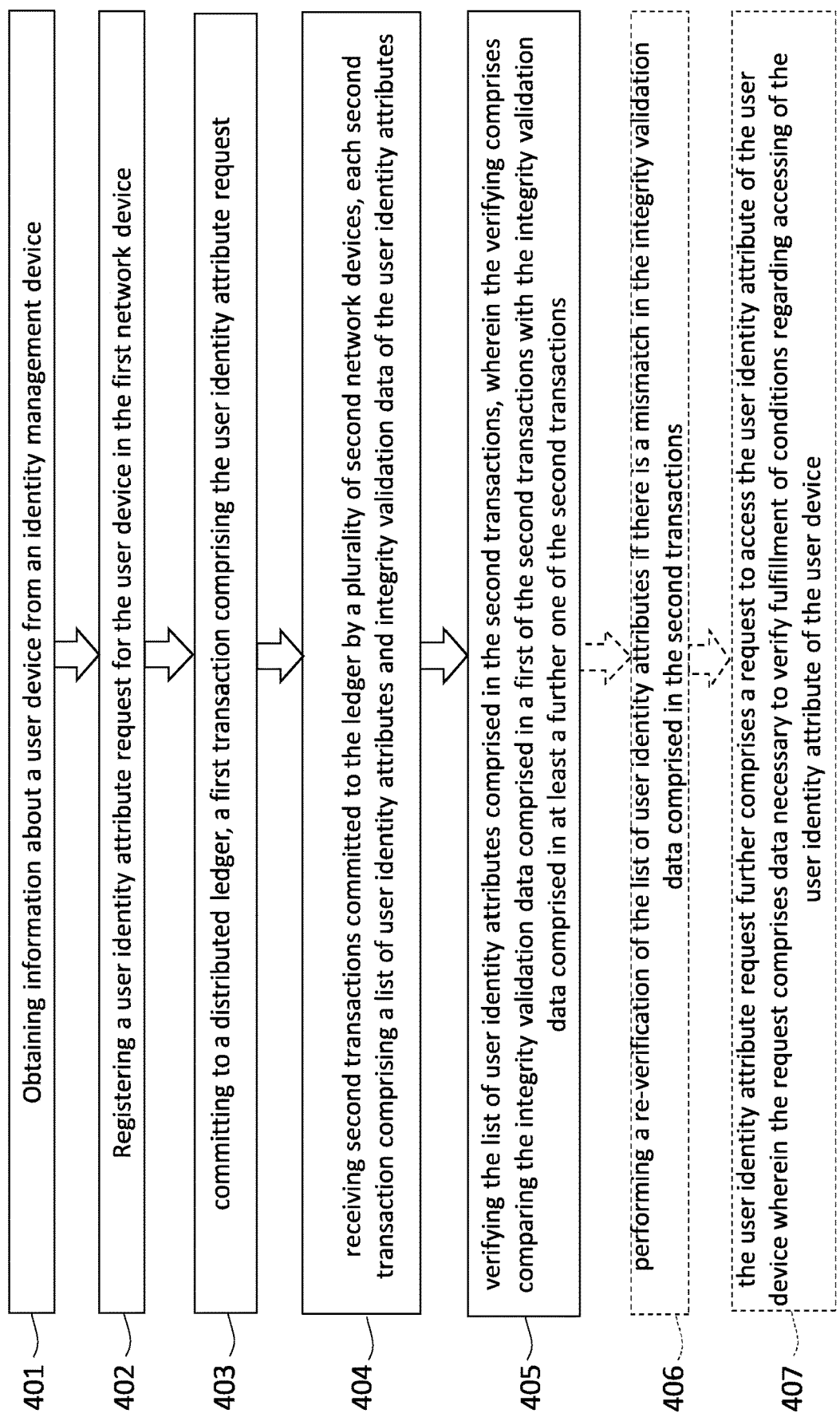
FIG. 4 is a flowchart illustrating a method performed by a first network device according to an embodiment herein.

FIG. 4 is a flowchart depicting an embodiment of a method performed by a first network device 102, said method comprising:
- obtaining 401, from an identity management device 103, information about a user device 101
- registering 402, in the first network device 102, a user identity attribute request of the user device 101
- committing 403, to a distributed ledger 105, a first transaction comprising the user identity attribute request
- receiving 404 second transactions, committed to the distributed ledger 105 by a plurality of second network devices 104, each second transaction comprising a list of user identity attributes and integrity validation data of the user identity attributes
- verifying 405 the list of user identity attributes comprised in the second transactions, wherein the verifying 405 comprises comparing the integrity validation data comprised in a first of the second transactions with the integrity validation data comprised in at least a further one of the second transactions In an embodiment, the said method further comprises a first optional step of performing a re-verification of the list of user identity attributes if there is a mismatch in the integrity validation data comprised in the second transactions. In yet another embodiment, the user identity attribute request may further comprise a request to access the user identity attribute of the user device 101. The request to access the user identity attribute of the user device 101 may comprise data necessary to verify fulfillment of conditions regarding accessing the user identity attribute of the user device 101. The request to access the user identity attribute of the user device 101 may include requesting access to a value of the user identity attribute of the user device 101.

It may be noted that there may exist an embodiment comprising only the first optional step in conjugation with the first five method steps of FIG. 4. Similarly, there may exist an embodiment comprising only the second optional step in conjugation with the first five method steps of FIG. 4. It may further be noted that there may exist an embodiment comprising both the first optional step and the second optional step in conjugation with the first five method steps of FIG. 4.

Figure 5:
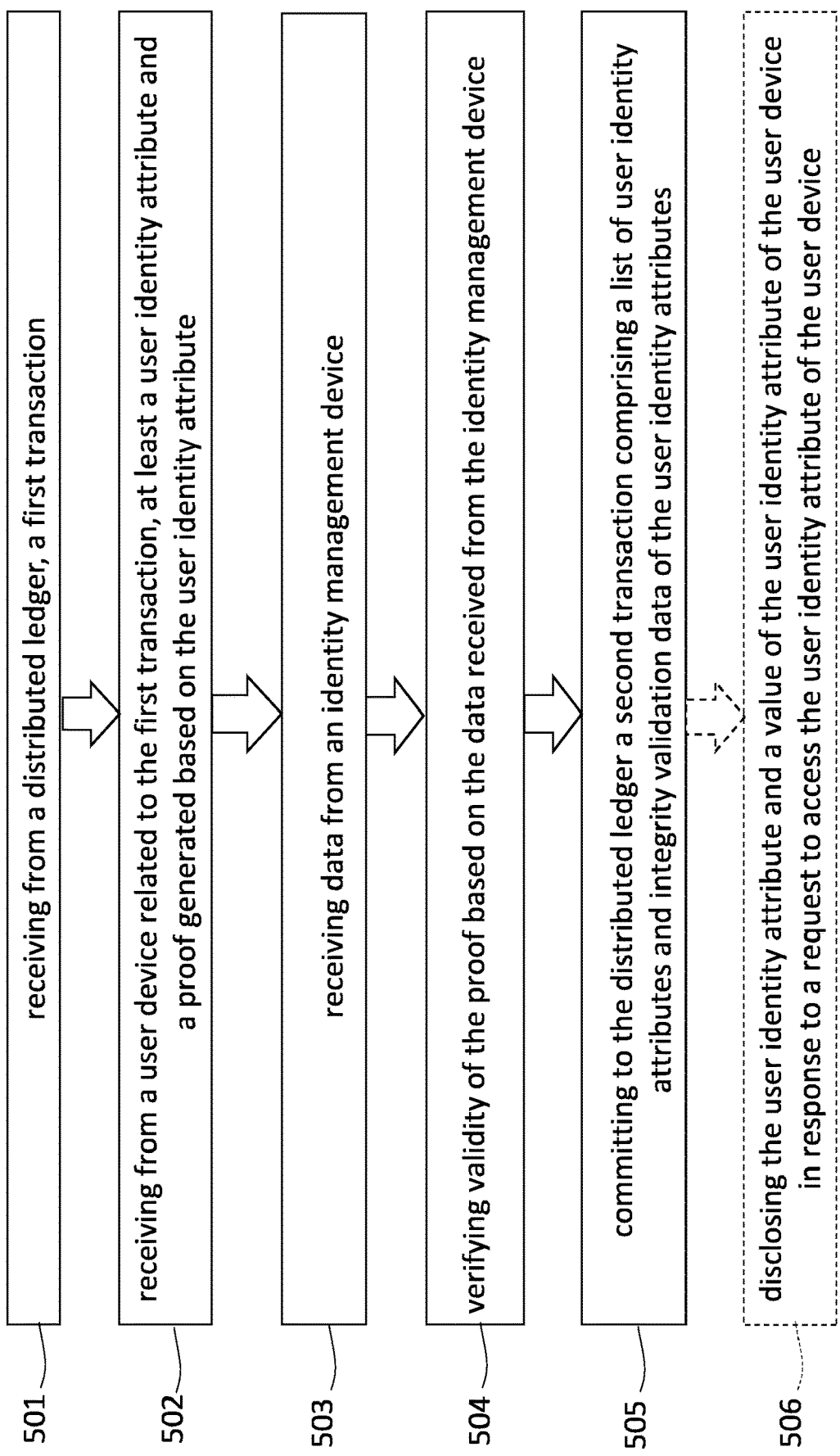
FIG. 5 is a flowchart illustrating a method performed by a second network device according to an embodiment herein.

FIG. 5 is a flowchart depicting an embodiment of a method performed by a second network device 104, said method comprising:
- receiving 501 from a distributed ledger 105, a first transaction
- receiving 502 from a user device 101 related to the first transaction, at least a user identity attribute and a proof generated based on the user identity attribute
- receiving 503 data from an identity management device 103
- certifying 504 validity of the proof based on the data received from the identity management device 103
- committing 505 to the distributed ledger 105 a second transaction comprising a list of user identity attributes and integrity validation data of the user identity attributes In an optional embodiment, the method may further comprise the step of disclosing 506 the user identity attribute in response to a request, by the first network device, to access the user identity attribute of the user device 101. The disclosing 506 may further include disclosing a value of a user identity attribute in response to a request, by the first network device, to access the user identity attribute of the user device 101. Additionally, the disclosing 506 may include disclosing a value of a user identity attribute in response to a request, by the first network device, to access a value of the user identity attribute of the user device 101.

Figure 7:
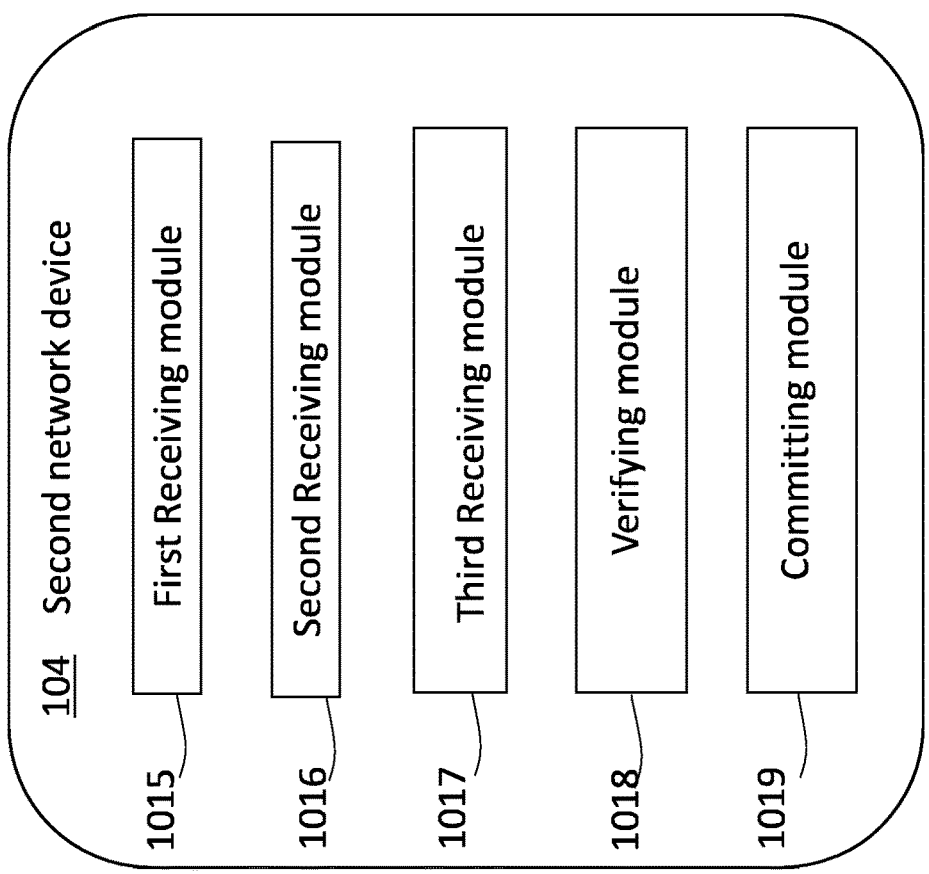
FIG. 7 is a block diagram depicting modules of a second network device according to embodiments herein.
Figure 6:
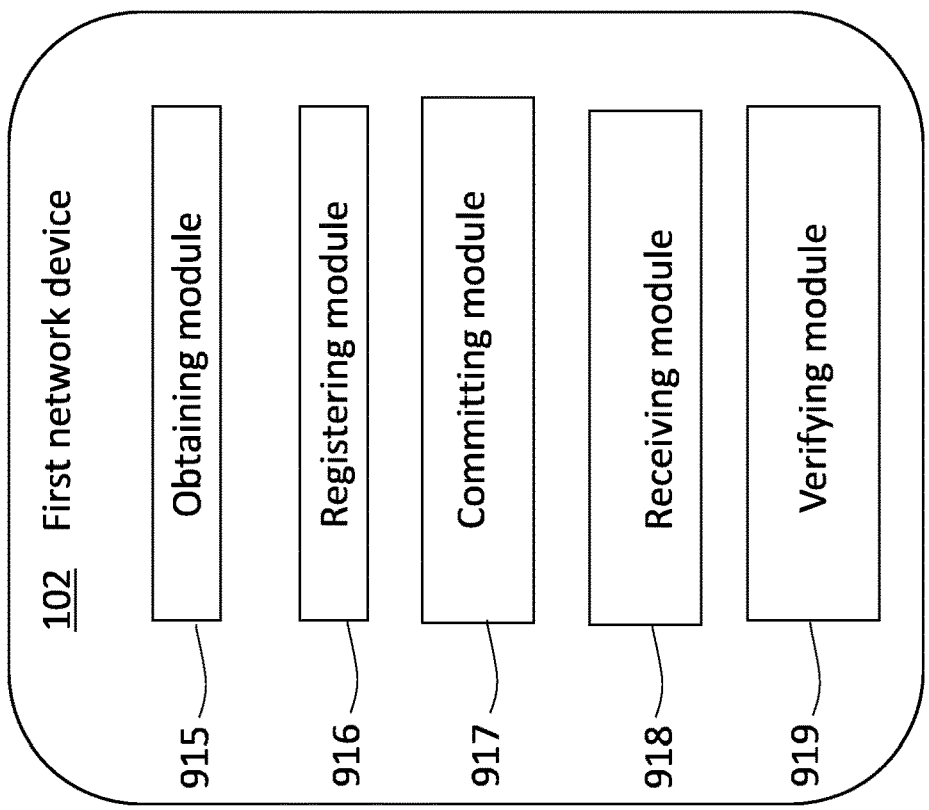
FIG. 6 is a block diagram depicting modules of a first network device according to embodiments herein.

FIG. 6 depicts the components of an embodiment of the first network device 102 as described in the present document. The first network device 102 of FIG. 6 comprises
- an obtaining module 915 which is operative to obtain information about a user device 101 from an identity management device 103
- a registering module 916 which is operative to register a user identity attribute request from the user device 101 in the first network device 102
- a committing module 917 which is operative to commit to a distributed ledger 105, a first transaction comprising the user identity attribute request
- a receiving module 918, which is operative to receive second transactions committed to the distributed ledger 105 by a plurality of second network devices 104, each second transaction comprising a list of user identity attributes and integrity validation data of the user identity attributes
- a verifying module 919 which is operative to verify the list of user identity attributes comprised in the second transactions, wherein the verifying module is operative to verify the list by comparing the integrity validation data comprised in a first of the second transactions with the integrity validation data in at least a further one of the second transactions FIG. 7 depicts the components of an embodiment of the second network device 104 as described in the present document. The second network device 104 comprises an
- a first receiving module 1015 which is operative to receive a first transaction from a distributed ledger 105
- a second receiving module 1016 which is operative to receive from a user device 101 related to the first transaction, at least a user identity attribute and a proof having been generated based on the user identity attribute
- a third receiving module 1017 which is operative to receive data from an identity management device 103
- a verifying module 1018 which is operative to verify validity of the proof based on the data received from the identity management device 103
- a committing module 1019 which is operative to commit to the distributed ledger 105 a second transaction relating to the first transaction, indicating receiving the user identity attribute from the user device 101

Figure 8:
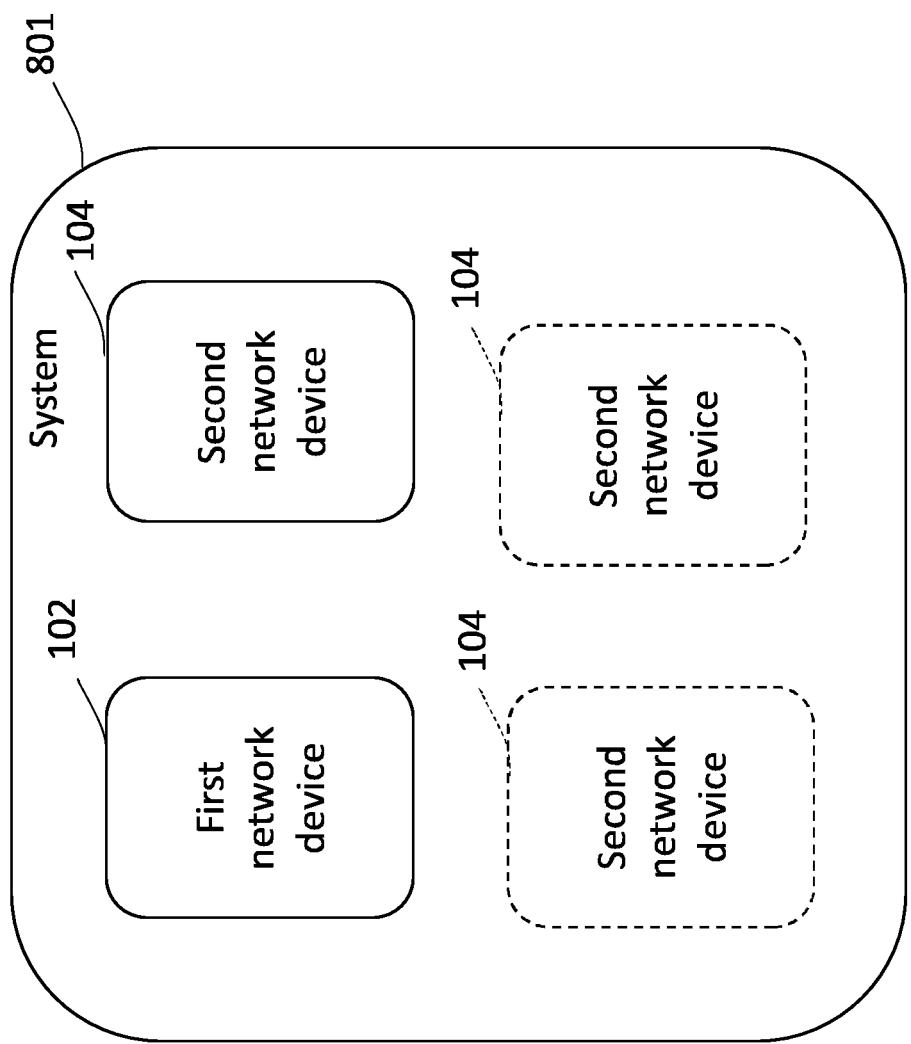
FIG. 8 is a block diagram depicting a system comprising a first network device and a second network device according to embodiments herein.

FIG. 8 illustrates an embodiment of a system 801 comprising a first network device 102 and a plurality of second network devices 104, said system being operative to
- obtain, at the first network device 102, information about a user device 101 from an identity management device 103;
- register, at the first network device 102, a user identity attribute request from the user device 101 in the first network device 102;
- commit, by the first network device 102 to a distributed ledger 105, a first transaction comprising the user identity attribute request;
- receive, at the second network device 104, from a distributed ledger 105, a first transaction;
- receive, at the second network device 104, from a user device 101 related to the first transaction, at least a user identity attribute and a proof generated based on the user identity attribute;
- receive at the second network device 104, data from an identity management device 103;
- verify at the second network device 104, validity of the proof based on the data received from the identity management device 103;
- commit at the second network device 104, to the distributed ledger 105 a second transaction comprising a list of user identity attributes and integrity validation data of the user identity attributes;
- receive at the first network device 102, second transactions committed to the distributed ledger 105 by a plurality of second network devices 104, each second transaction comprising a list of user identity attributes and integrity validation data of the user identity attributes;
- verify at the first network device 102, the list of user identity attributes comprised in the second transactions, wherein the verify comprises comparing the integrity validation data comprised in a first of the second transactions with the integrity validation data comprised in at least a further one of the second transactions.

A first network device 102 (FND) is an electronic device that communicatively interconnects other electronic devices on the network (e.g., another first network device 102, or an end-user device 101). A first network device 102 can be a multiple services network devices that provides support for multiple networking functions (e.g., routing, bridging, switching, Layer 2 aggregation, session border control, Quality of Service, and/or subscriber management), and/or provide support for multiple application services (e.g., data, voice, and video, etc.) and/or a User Equipment or any other suitable electronic device.

Figure 9:
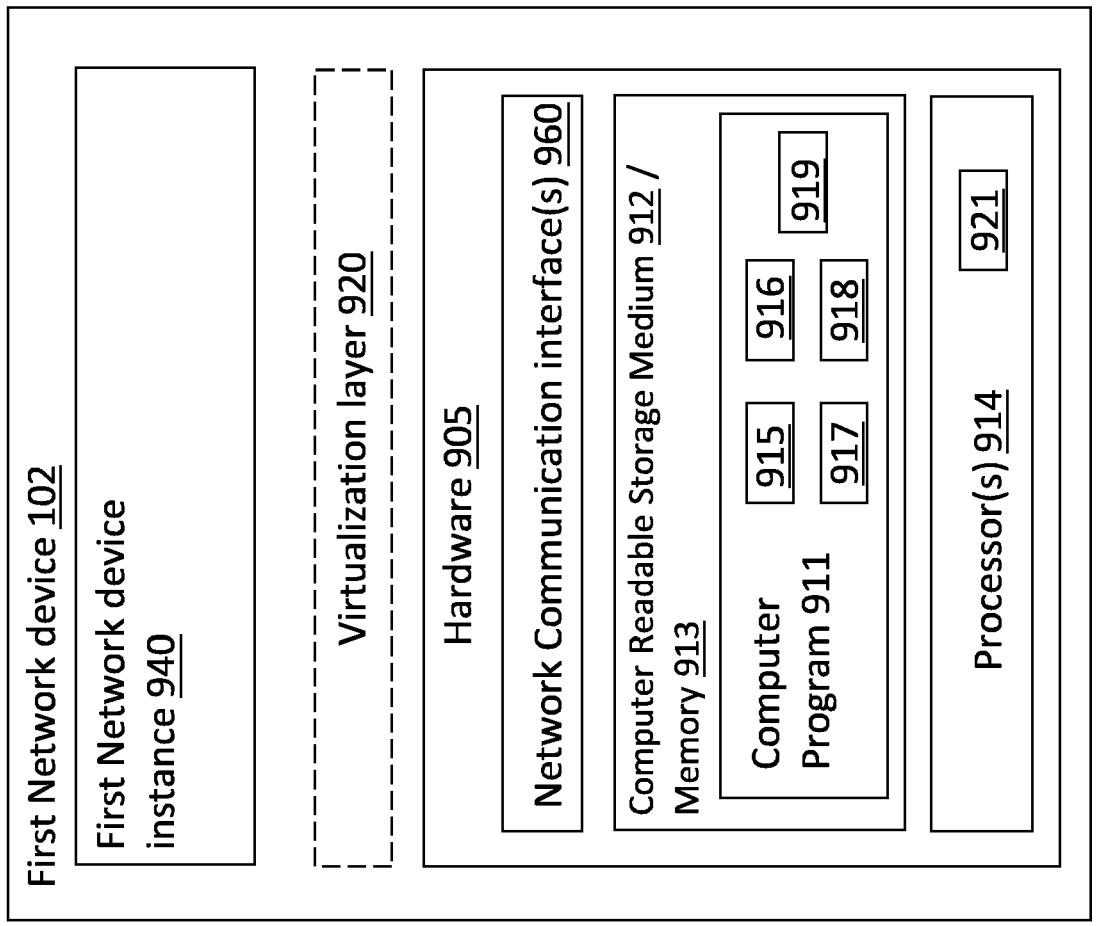
FIG. 9 is a block diagram depicting a first network device according to embodiments herein.

FIG. 9 illustrates a block diagram for a first network device 102 that can be used for implementing one or more of the operations described herein, in accordance with some embodiments. According to one embodiment, the first network device 102 is an electronic device which includes hardware 905. Hardware 905 includes one or more processors 914, network communication interfaces 960 coupled with a memory 913. The memory 913 may include a computer program 911. The memory 913 may also be referred as computer readable storage medium 912. While one embodiment does not implement virtualization, alternative embodiments may use different forms of virtualization—represented by a virtualization layer 920. In these embodiments, the First Network device instance 940 and the hardware that executes form a virtual server which is a software instance of the modules stored on the memory 913. The computer program 911 includes instructions, which when executed by the hardware 905, cause the instance 940 to perform the operations described with reference to FIG. 4.

The obtaining module 915, the registering module 916, the committing module 917, the receiving module 918 and the verifying module 919 may be implemented by using a software component and/or a hardware component. The software component may reside in the memory 913. The hardware component may reside in the one or more processors 914 or as a separate component in the hardware 905. The software component may be executed on the hardware component. In an embodiment, the first ledger peer 204 is implemented by use of the obtaining module 915. In an embodiment, the distributed ledger 105 and/or a first agent 206 is implemented by use of registering module 916. In an embodiment, the first ledger peer 204 is implemented by use of the committing module 917. In an embodiment, the first ledger peer 204 is implemented by use of the receiving module 918. In an embodiment, the verifying module 919 includes a first private database 207 to store a user identity attribute.

In an embodiment, the obtaining module 915, the registering module 916, the committing module 917, the receiving module 918 and the verifying module 919 are all hardware modules.

In an embodiment, the obtaining module 915, the registering module 916, the committing module 917, the receiving module 918 and the verifying module 919 are all implemented as part of computer program 911.

The memory 913 may further comprise a second memory 921 which may be used to store the virtualization layer 920 software or First network device instance 940. In an embodiment, the virtualization layer 920 software or First network device instance 940 may be stored in the memory 913. The memory 913 may be a component different from the processor 912 or part of the same processor 912.

A second network device 104 (SND) is an electronic device that communicatively interconnects other electronic devices on the network (e.g., other second network devices 104, end-user device 101s, first network device 102). Some second network devices 104 are multiple services network devices that provide support for multiple networking functions (e.g., routing, bridging, switching, Layer 2 aggregation, session border control, Quality of Service, and/or subscriber management), and/or provide support for multiple application services (e.g., data, voice, and video, etc.). It may be noted that in the present document, any reference to a second network device 104 performing an action may in turn be a reference to a plurality of second network devices 104 performing the action.

Figure 10:
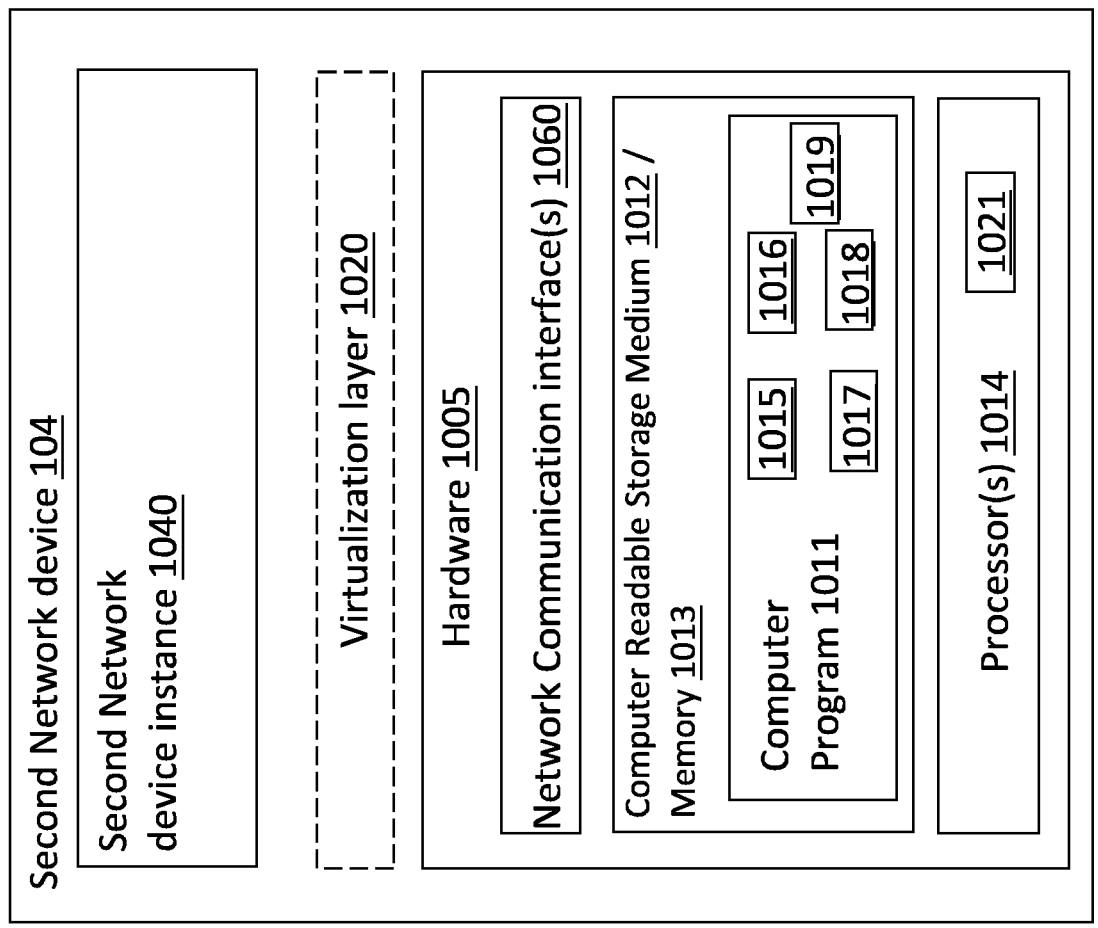
FIG. 10 is a block diagram depicting a second network device according to embodiments herein.

FIG. 10 illustrates a block diagram for a second network device 104 that can be used for implementing one or more of the operations described herein, in accordance with some embodiments. According to one embodiment, the SND 104 is an electronic device which includes hardware 1005. Hardware 1005 includes one or more processors 1014, network communication interfaces 1060 coupled with a memory 1013. The memory 1013 may include a computer program 1011. The memory 1013 may also be referred as computer readable storage medium 1012. While one embodiment does not implement virtualization, alternative embodiments may use different forms of virtualization—represented by a virtualization layer 1020. In these embodiments, the instance 1040 and the hardware that executes form a virtual server, which is a software instance of the modules stored on the memory 1013. The computer program 1011 includes instructions, which when executed by the hardware 1005, causes the instance 1040 to perform the operations described with reference to FIG. 5.

The first receiving module 1015, the second receiving module 1016, the third receiving module 1017, the verifying module 1018 and the committing module 1019 may be implemented by using a software component and/or a hardware component. The software component may reside in the memory 1013. The hardware component may reside in the processor 1014 or as a separate component in the hardware 1005. The software component may be executed in the hardware component. In an embodiment, the second ledger peer 208 is implemented by use of the first receiving module 1015. In an embodiment, the second agent 209 and/or the second private database 210 is implemented by use of the second receiving module 1016. In an embodiment, the second agent 209 is implemented by use of the third receiving module 1017.

In an embodiment, the second ledger peer 208 is implemented by use of the verifying module 1018. In an embodiment, the second ledger peer 208 is implemented by use of the committing module 1019.

In an embodiment, the first receiving module 1015, the second receiving module 1016, the third receiving module 1017, the verifying module 1018 and the committing module 1019 are all hardware modules.

In an embodiment, the first receiving module 1015, the second receiving module 1016, the third receiving module 1017, the verifying module 1018 and the committing module 1019 are all implemented as part of computer program 1011.

The memory 1013 may further comprise a second memory 1021 which may be used to store the virtualization layer 1020 software or the second network device instance 1040. In an embodiment, the virtualization layer 1020 software or the second network device instance 1040 is stored in the memory 1013. The memory 1013 may be a component different from the processor 1012 or part of the processor 1012.

In an embodiment, a network device may comprise the hardware components of the FND and/or SND and may perform the functions related to the FND and/or the SND.

An electronic device stores and transmits, internally and/or with other electronic devices over a network, code which is composed of software instructions and which is sometimes referred to as computer program code or a computer program and/or data using machine-readable media (also called computer-readable media), such as machine-readable storage media (e.g., magnetic disks, optical disks, solid state drives, read only memory (ROM, flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data.

For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower nonvolatile memory into volatile memory (e.g., dynamic random access memory (DRAM), static random access memory (SRAM) of that electronic device). Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the disclosure may be implemented using different combinations of software, firmware, and/or hardware.

While the flow diagrams in the figures show a particular order of operations performed by certain embodiments of the disclosure, it should be understood that such order is exemplary (e.g., alternative embodiments may perform the operations in a different order, combine certain operations, overlap certain operations, etc.). While the disclosure has been described in terms of several embodiments, those skilled in the art will recognize that the disclosure is not limited to the embodiments described, can be practiced with modification and alteration within the spirit and scope of the appended claims. The description is thus to be regarded as illustrative instead of limiting.

ABBREVIATION

DKMS—Decentralized Key Management System
DRAM—Dynamic Random-Access Memory
EEP—Entity Escrowing Policy
FND—First network device
GDPR—General Data Protection Regulation
NIC—Network Interface Controller
RAM—Random Access Memory
ROM—Read Only Memory
RC—Recovery Condition
SRAM—Static Random-Access Memory
SND—Second network device

The invention claimed is:

1. A method performed by a first network device, the method comprising:
   obtaining, from an identity management device, information about a user device,
   registering, in the first network device, a user identity attribute request for the user device,
   committing, to a distributed ledger, a first transaction comprising the user identity attribute request,
   receiving a result of an execution of a consensus mechanism for verifying a list of user identity attributes of the user device, wherein the consensus mechanism is executed by devices that are part of the distributed ledger, and
   sending, to a second network device, if the result of the execution of the consensus mechanism is positive, a request to access a user identity attribute and a value of the user identity attribute of the user device, wherein the request comprises information on fulfilling at least a condition for recovering the user identity attribute of the user device.

2. The method according to claim 1, wherein the user identity attribute request comprises information relating to at least one of: at least a user identity attribute to be provided to a plurality of second network devices, a condition to be fulfilled for recovery of the user identity attribute of the user device, and a split of user identity attributes of the user device among the plurality of second network devices.

3. The method according to claim 1, further comprising performing a re-verification of the list of user identity attributes if the result of the consensus mechanism is negative.

4. The method according to claim 1, wherein the obtaining information from an identity management device comprises obtaining an address of a user agent of the user device.

5. The method according to claim 1, further comprising generating, for the user device, an anonymous identifier associated with the information obtained from the identity management device.

6. The method according to claim 5, further comprising:
   generating an anonymous identifier credential associated with the generated anonymous identifier and the user device, and
   initiating storing of the anonymous identifier credential in the user device.

7. The method according to claim 1, wherein the identity management device is a decentralized identity management device.

8. A method performed by a second network device, the method comprising:
   receiving, from a distributed ledger, a first transaction committed by a first network device,
   receiving, from a user device related to the first transaction, at least a user identity attribute of the user device, a value of the user identity attribute of the user device and a proof generated based on the user identity attribute of the user device,
   receiving data from an identity management device,
   verifying validity of the proof based on the data received from the identity management device and storing, in a private database, the user identity attribute of the user device and the value of the user identity attribute of the user device, and
   disclosing, to the first network device, the user identity attribute of the user device and the value of the user identity attribute of the user device, wherein the disclosing comprises disclosing, upon receiving information on fulfilling at least a condition for recovering the user identity attribute of the user device, wherein the information is comprised in a request to access the user identity attribute and the value of the user identity attribute of the user device.

9. The method according to claim 8, further comprising authenticating the second network device to the user device before receiving, from the user device, the at least a user identity attribute and the proof.

10. The method according to claim 8, wherein the proof comprises an anonymous identifier.

11. The method according to claim 8, wherein verifying the validity of the proof comprises certifying the user identity attribute with an identity management device.

12. A first network device, comprising;
   one or more processors; and
   a memory, said memory containing instructions which, when executed by said one or more processors, cause the first network device to:
      obtain, from an identity management device, information about a user device,
      register, in the first network device, a user identity attribute request for the user device,
      commit, to a distributed ledger, a first transaction comprising the user identity attribute request,
      receive a result of an execution of a consensus mechanism for verifying a list of user identity attributes of the user device, wherein the consensus mechanism is executed by devices that are part of the distributed ledger, and
      send to a second network device, if the result of the execution of the consensus mechanism is positive, a request to access a user identity attribute and a value of the user identity attribute of the user device, wherein the request comprises information on fulfilling at least a condition for recovering the user identity attribute of the user device.

13. The first network device according to claim 12, wherein the user identity attribute request comprises information relating to at least one of: at least a user identity attribute to be provided to a plurality of second network devices, a condition to be fulfilled for recovery of the user identity attribute of the user device, and a split of user identity attributes of the user device among the plurality of second network devices.

14. The first network device according to claim 12, wherein the instructions when executed by the one or more processors, cause the first network device to perform a re-verification of the list of user identity attributes if there is a mismatch in integrity validation data comprised in a second transaction.

15. The first network device according to claim 14, wherein performing the re-verification further comprises committing to the distributed ledger a transaction to request, from a plurality of second network devices, a list of user identity attributes and integrity validation data of the list of user identity attributes.

16. The first network device according to claim 12, wherein to obtain information from an identity management device comprises to obtain an address of a user agent of the user device.

17. The first network device according to claim 12, wherein the instructions when executed by the one or more processors, cause the first network device to generate, for the user device, an anonymous identifier associated with the information obtained from the identity management device.

18. The first network device according to claim 17, wherein the instructions when executed by the one or more processors, cause the first network device to:
   generate an anonymous identifier credential associated with the generated anonymous identifier and the user device, and
   initiate storing of the anonymous identifier credential in the user device.

19. The first network device according to claim 16, wherein the first transaction further comprises an anonymous identifier and an address of a user agent.

20. A second network device, comprising;
one or more processors; and
a memory, said memory containing instructions which, when executed by said one or more processors, cause the second network device, to:
   receive from a distributed ledger, a first transaction committed by a first network device,
   receive from a user device related to the first transaction, at least a user identity attribute of the user device, a value of the user identity attribute of the user device and a proof generated based on the user identity attribute of the user device,
   receive data from an identity management device,
   verify validity of the proof based on the data received from the identity management device and store, in a private database, the user identity attribute of the user device and the value of the user identity attribute of the user device, and
   disclose, to the first network device, the user identity attribute of the user device and the value of the user identity attribute of the user device, upon receiving information on fulfilling at least a condition for recovering the user identity attribute of the user device, wherein the information is comprised in a request to access the user identity attribute and the value of the user identity attribute of the user device.

\* \* \* \* \*